United States Patent
Taft et al.

(10) Patent No.: US 12,488,000 B2
(45) Date of Patent: Dec. 2, 2025

(54) SYSTEMS AND METHODS FOR LOCALITY-AWARE QUERY OPTIMIZATION

(71) Applicant: Cockroach Labs, Inc., New York, NY (US)

(72) Inventors: Rebecca Taft, Chicago, IL (US); Mark Sirek, San Diego, CA (US); Andrew E. Kimball, Moraga, CA (US)

(73) Assignee: Cockroach Labs, Inc., New York, NY (US)

( * ) Notice: Subject to any disclaimer, the term of this patent is extended or adjusted under 35 U.S.C. 154(b) by 0 days.

(21) Appl. No.: 18/090,994

(22) Filed: Dec. 29, 2022

(65) Prior Publication Data

US 2024/0220498 A1 Jul. 4, 2024

(51) Int. Cl.
*G06F 16/2455* (2019.01)
*G06F 16/2453* (2019.01)

(52) U.S. Cl.
CPC .... *G06F 16/24542* (2019.01); *G06F 16/2455* (2019.01)

(58) Field of Classification Search
CPC .......................................... G06F 16/245–2477
See application file for complete search history.

(56) References Cited

U.S. PATENT DOCUMENTS

| | | | |
|---|---|---|---|
| 2002/0120618 A1* | 8/2002 | Ushijima | G16B 50/00 |
| 2005/0050041 A1* | 3/2005 | Galindo-Legaria | G06F 16/2462 |
| 2009/0024622 A1* | 1/2009 | Chkodrov | G06F 16/24568 |
| 2010/0005077 A1* | 1/2010 | Krishnamurthy | G06F 16/24542 707/E17.136 |
| 2015/0248461 A1* | 9/2015 | Theeten | G06F 16/24524 707/718 |
| 2022/0277010 A1* | 9/2022 | Zhou | G06F 16/24556 |

OTHER PUBLICATIONS

Chen, Jack, et al. "The MemSQL Query Optimizer: A modern optimizer for real-time analytics in a distributed database." Proceedings of the VLDB Endowment 9.13 (2016): 1401-1412 (pp. 1401-1412).

(Continued)

*Primary Examiner* — Robert W Beausoliel, Jr.
*Assistant Examiner* — Nirav K Khakhar
(74) *Attorney, Agent, or Firm* — Goodwin Procter LLP

(57) ABSTRACT

Methods and systems for locality-aware query planning in a distributed computing system are provided. A query is received from a client device at a gateway node geographically located in a first database region. A plurality of query plans for execution of the query are generated at the gateway node. A first query plan of the query plans is configured to cause communication between the gateway node and a subset of computing nodes that are geographically located in a first external database region that is external to the first database region. A respective cost for each of the query plans is determined. The respective cost for the first query plan is based on an indication of a latency between the first database region and the first external database region. An optimal query plan from the query plans is determined and executed based on each respective cost for the query plans.

20 Claims, 6 Drawing Sheets

(56) References Cited

OTHER PUBLICATIONS

Shankar, Srinath, et al. "Query optimization in microsoft SQL server PDW." Proceedings of the 2012 ACM SIGMOD International Conference on Management of Data. 2012 (pp. 767-775).
Viswanathan, Raajay, et al. "CLARINET: WAN-Aware Optimization for Analytics Queries." 12th USENIX Symposium on Operating Systems Design and Implementation (OSDI 16). 2016, (pp. 435-450).

* cited by examiner

SYSTEMS AND METHODS FOR LOCALITY-AWARE QUERY OPTIMIZATION

FIELD OF TECHNOLOGY

The present disclosure relates generally to methods and systems for query planning in a database and more particularly, to locality-aware query planning in a distributed computing system comprising a plurality of computing nodes.

BACKGROUND

The foregoing examples of the related art and limitations therewith are intended to be illustrative and not exclusive, and are not admitted to be "prior art." Other limitations of the related art will become apparent to those of skill in the art upon a reading of the specification and a study of the drawings. In some cases, relational databases can apply replication to ensure data survivability, where data is replicated among one or more computing devices ("nodes") of a group of computing devices ("cluster"). A relational database may store data within one or more ranges, where a range includes one or more key-value (KV) pairs and can be replicated among one or more nodes of the cluster. A range may be a partition of a data table ("table"), where a table may include one or more ranges. The database may receive requests (e.g., such as structured query language (SQL) queries originating from client devices) directed to data and/or schemas stored by the database, where nodes storing the database determine query plans needed to execute received requests and coordinate among the nodes.

In some cases, query optimizers (referred to herein as "optimizers") of a database can implement a cost-based approach to determine a query plan (also referred to as "execution plan" and "operation tree") for executing a query directed to the database. Optimizers may be SQL query optimizers for received SQL queries directed to a relational database. In some cases, the query optimizers can determine an optimal (e.g., most-efficient) query plan for a query. To determine the optimal query plan, an optimizer may determine a number of candidate query plans. The optimizer may determine (e.g., calculate and/or estimate) a cost of each candidate query plan in terms of the respective candidate query plan's estimated utilization of computational resources of nodes and/or network(s) connecting nodes, such as processor (e.g., central processing unit (CPU)), input/output (I/O) bandwidth, and/or memory. In some cases, costs models of optimizers for distributed databases can include an estimated utilization of network bandwidth for communicating between nodes. However, cost models of optimizers do not account for the network latency of a candidate query plan that would communicate with nodes (e.g., by accessing stored data) located in different geographic regions (e.g. such as database regions) when determining the cost of the candidate query plan.

For databases configured to serve online transaction processing (OLTP) workloads in geographically distributed deployments, ignoring cross-region latency when determining costs of candidate query plans can lead to selection and execution of suboptimal query plans. For example, a query that would normally execute in less than 5 milliseconds (ms) on a single node may take hundreds of ms when the data subject to the query is required to be fetched from a node located in a remote geographic region (e.g., as the round-trip time between distant geographic regions can be up to 300 ms). Any given query can have multiple logically equivalent possible execution plans, and in a multi-region database including one or more database regions, different execution plans for the same query can interact with nodes geographically located in different groups of database region(s). However, optimizers lack awareness of (i) localities (e.g., database regions) of nodes storing data subject to a query; and (ii) latencies between different localities (e.g., database regions), such that optimizers fail to take such localities and latencies into account when determining a candidate query plan's estimated cost.

Further, some query plans are not explored and evaluated by optimizers because the query plans would not improve the performance of a query when executed on a single node and/or within a single locality (e.g., database region). However, at least some of such query plans can significantly improve the performance of queries executed in a multi-region database stored by a geographically distributed cluster of nodes.

In some cases, individuals (e.g., such as database administrators) may want to prevent and prohibit queries (referred to as "cross-region queries") that span multiple database regions. For example, the individuals may wish to provide a restriction that prevents users of the database (e.g., developers) from writing poorly-performing queries and/or that ensures that queries are in compliance with different types of data regulations. Accordingly, improved systems and methods are desired for locality-aware optimizers that can account for latencies (e.g., round-trip communication times) between database regions of a geographically distributed (e.g., multi-region) database when generating candidate query plans for a query and selecting an optimized (e.g., performance-optimized) query plan from the generated candidate query plans. Further, improved systems and methods are desired for locality-aware optimizers that are aware of localities (e.g., database regions) corresponding to stored data and that can prevent cross-region queries.

SUMMARY

Methods and systems for locality-aware query planning in a distributed computing system including a plurality of computing nodes are disclosed. In one aspect, embodiments of the invention feature a method for locality-aware query planning in a distributed computing system including a plurality of computing nodes. According to one embodiment, the method can include receiving, from a client device at a gateway node of the plurality of computing nodes, a query directed to data stored by the plurality of computing nodes, wherein the gateway node is geographically located in a first database region. The method can include generating, at the gateway node based on the query, a plurality of candidate query plans for execution of the query, wherein a first candidate query plan of the plurality of candidate query plans is configured to cause communication between the gateway node and a subset of the plurality of computing nodes that are geographically located in a first external database region that is external to the first database region. The method can include determining a respective cost for each candidate query plan of the plurality of candidate query plans, wherein the respective cost for the first candidate query plan is based on an indication of a latency between the first database region and the first external database region. The method can include determining an optimal query plan from the plurality of candidate query plans based on each respective cost for the plurality of candidate query plans. The method can include executing the query at one or more of the plurality of computing nodes based on the optimal query plan.

Various embodiments of the method can include one or more of the following features. The gateway node may host a communicative connection with the client device. The method can further include determining the indication of the latency between the first database region and the first external database region. The latency between the first database region and the first external database region can include a round-trip communication time between the first database region and the first external database region. The generating the plurality of candidate query plans for execution of the query can further include generating, based on one or more logically equivalent operations, a plurality of physical operation trees each including one or more physical operators and one or more edges indicative of an order of execution of the one or more physical operators, wherein each of the plurality of candidate query plans can include a respective physical operation tree of the plurality of physical operation trees, wherein each of the plurality of physical operation trees can include one or more paths each including a respective subset of the one or more physical operators and a respective subset of the one or more edges.

In some embodiments, the first candidate query plan can include a first operation tree of the plurality of physical operation trees, where the first operation tree includes s a first distribution physical property indicative of the first database region and a second distribution property indicative of the first external database region. In some embodiments, the first operation tree can include a first distribute physical operator including indications of the first distribution physical property and the second distribution physical property, wherein the first distribute physical operator is configured to enforce the second distribution physical property by causing communication between the gateway node and a first computing node of the subset of the plurality of computing nodes, wherein the first computing node is geographically located in the first external database region. In some embodiments, the subset of the plurality of computing nodes are geographically located in the first external database region and a second external database region that are each external to the first database region, wherein a second computing node of the subset of the plurality of computing nodes is geographically located in the second external database region. In some embodiments, the second distribution physical property is indicative of the first external database region and the second external database region, wherein the first distribute physical operator is configured to enforce the second distribution physical property by causing communication between the gateway node and the second computing node. In some embodiments, the first operation tree can include a third distribution property indicative of the second external database region, wherein the first operation tree can include a second distribute physical operator including indications of the second distribution physical property and the third distribution physical property, wherein the second distribute physical operator is configured to enforce the third distribution physical property by causing communication between the first computing node and the second computing node.

The determining the plurality of costs for the plurality of candidate query plans can further include determining a latency cost for the indication of the latency between the first database region and the first external database region; determining a utilization cost for an estimated utilization of computing resources for execution of the query based on the first candidate query plan; and determining the respective cost for the first candidate query plan based on a combination of the latency cost and the utilization cost. In some embodiments, the computing resources can include a processor of the one or more computing nodes, an input/output bandwidth of the one or more computing nodes, a memory of the one or more computing nodes, and/or a network bandwidth for one or more networks communicatively connecting the one or more computing nodes. The determining the optimal query plan from the plurality of candidate query plans can further include identifying a lowest cost of the plurality of costs, wherein the optimal query plan includes the lowest cost; and selecting the optimal query plan based on the optimal query plan including the lowest cost. The method can further include sending, based on the executing step and by the gateway node, a result for the query to the client device. The query can include an indication of an enabled session mode at the client device. The method can further include based on determining the query is required to execute external to the first database region, terminating the query; and sending an indication of an error for the query to the client device. A plurality of database regions can include the first database region and the first external database region, wherein each of the plurality of database regions corresponds to a respective geographic region including at least one computing node of the plurality of computing nodes.

In another aspect, the invention features a system for locality-aware query planning. The system can include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
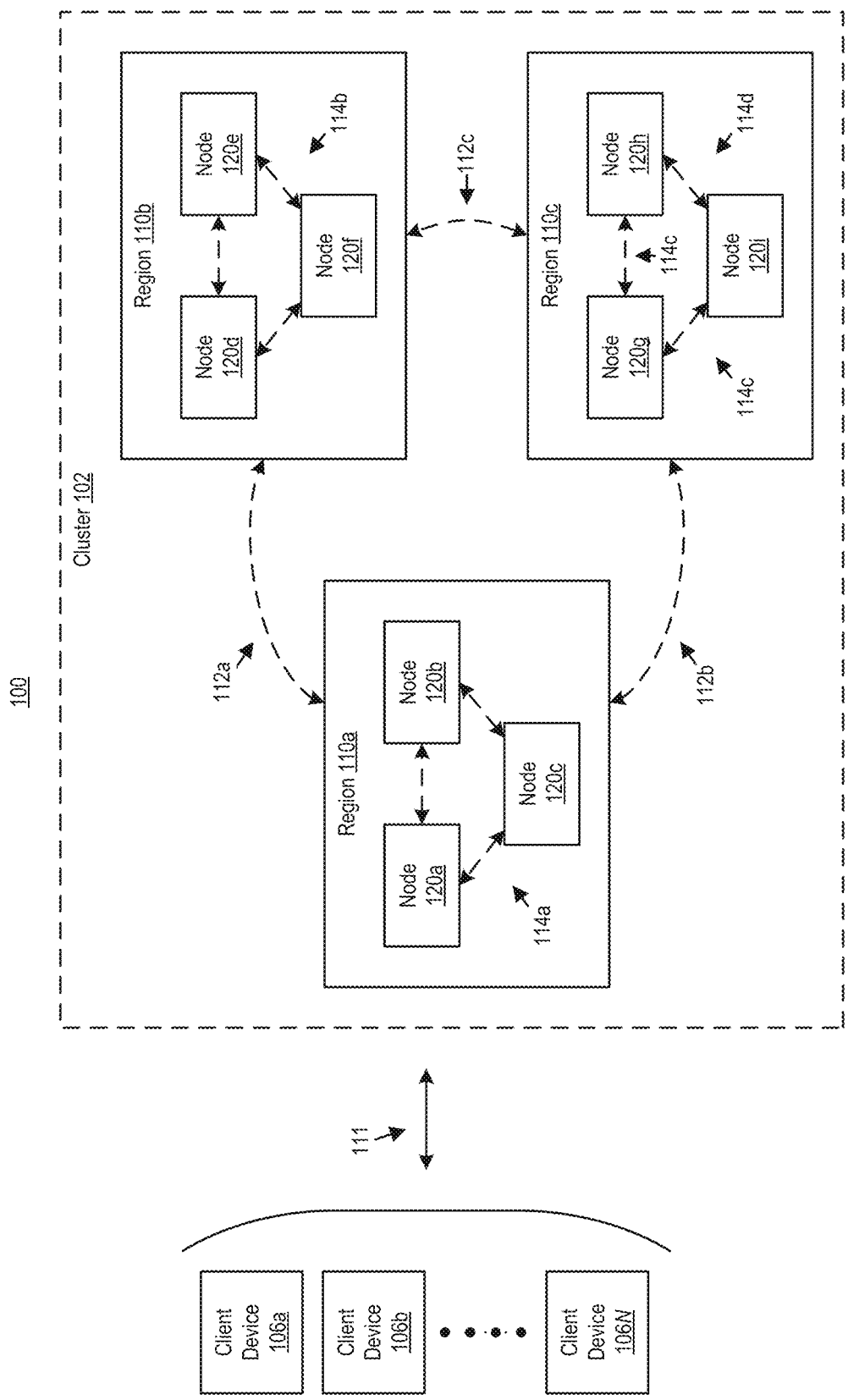
FIG. 1 ("FIG. 1") shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for locality-aware optimizers for generating optimized query plans to execute queries directed to a distributed database are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

Conventional optimizers that generate and select query plans for executing queries lack locality awareness. When determining costs of candidate query plans, such optimizers lack locality awareness by failing to account and determine costs for network latency required to coordinate with nodes (e.g., send and/or receive data with nodes) stored in different geographic regions. Further, based on the lack of locality awareness, these optimizers fail to explore and evaluate certain query plans that would execute on a single node and/or within a single database region, which can further contribute to selection and execution of queries according to suboptimal query plans. Finally, conventional cost-based optimizers lack abilities to adhere a preference to prohibit cross-region queries that require coordination and/or communication among nodes geographically located among multiple geographic regions. As an example, conventional optimizers cannot adhere to a preference to prohibit cross-region queries that are required to access and/or operate on data stored among multiple geographic regions.

Locality-aware optimizers are described herein that can remedy the above-described deficiencies of conventional optimizers for query planning and execution. A locality-aware optimizer may receive data indicative of geographic deployments of data stored by a database, including latencies between respective geographic regions (referred to herein as "database regions") in which data is stored. To optimally evaluate and select a query plan, a locality-aware optimizer may determine respective costs of a number of generated candidate query plans based on a locality-aware cost-model that determines costs for latencies between database regions that may be identified in an operation tree of a candidate query plan. To execute a query according to such a candidate query plan, coordination and/or communication may be required between nodes geographically located in the database regions identified in the operation tree. From the candidate query plans, the locality-aware optimizer may select and execute the optimal (e.g., lowest cost and/or most-efficient) query plan determined from the locality-aware cost model, where the optimal query plan may have any combination of: (i) a lowest latency cost; and (ii) a lowest computational cost (e.g., defined based on processor (e.g., CPU) utilization, I/O bandwidth utilization, and/or memory utilization for the nodes that are required to communicate to execute a particular query plan). Further, the locality-aware optimizer may include transformations that enable generation of candidate query plans that are optimized for intra-region or inter-region execution in a geographically distributed (e.g., multi-region) database based on user preferences provided at client devices.

Terms

"Cluster" generally refers to a deployment of computing devices that comprise a database. A cluster may be located in one or more geographic locations (e.g., data centers). The one or more geographic locations may be located within a single geographic region (e.g., eastern United States, central United States, etc.) or more than one geographic location. For example, a cluster may include computing devices (e.g., computing nodes) that are located in both the eastern United States and western United States, with 2 data centers in the eastern United states and 4 data centers in the western United States. The geographic regions of the cluster may correspond to cluster regions and database regions as described herein.

"Node" generally refers to an individual computing device that is a part of a cluster. A node may join with one or more other nodes to form a cluster. One or nodes that comprise a cluster may store data (e.g., tables, indexes, etc.) in a map of KV pairs. A node may store a "range", which can be a subset of the KV pairs (or all of the KV pairs depending on the size of the range) stored by the cluster. A range may also be referred to as a "shard" and/or "partition". A table and its secondary indexes can be mapped to one or more ranges, where each KV pair in a range may represent a single row in the table (which can also be referred to as the primary index because the table is sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (referred to as a primary index) for the primary key column(s). A primary key may be defined for each table stored by a database as described herein. An example of a second type of index may be a secondary index. A secondary index may be defined on non-primary key columns of a table. A table that does not include a defined primary index may include a hidden row identifier (ID) column (e.g., referred to as rowid) that uniquely identifies each row of the table as an implicit primary index.

"Replica" generally refers to a copy of a range. A range may be replicated a threshold number of times. For example, a range may be replicated 3 times into 3 distinct replicas. Each replica of a range may be stored on a distinct node of a cluster. For example, 3 replicas of a range may each be stored on a different node of a cluster. In some cases, a range may be required to be replicated a minimum of 3 times.

"Leaseholder" or "leaseholder replica" generally refers to a replica of a range that is configured to hold the lease for the replicas of the range. The leaseholder may receive and/or coordinate read transactions and write transactions directed to one or more KV pairs stored by the range. "Leaseholder node" may generally refer to the node of the cluster that stores the leaseholder replica. The leaseholder may receive read transactions and serve reads to client devices indicated by the read transactions. Other replicas of the range that are not the leaseholder may receive read transactions and route the read transactions to the leaseholder, such that the leaseholder can serve the read based on the read transaction.

"Raft leader" or "leader" generally refers to a replica of the range that is a leader for managing write transactions for a range. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write transactions from the leader replica.

"Raft log" generally refers to a time-ordered log of write transactions to a range, where the log of write transactions includes write transactions agreed to by a threshold number of the replicas of the range. Each replica of a range may include a raft log stored on the node that stores the replica. A raft log may be a source of truth for replication among nodes for a range.

"Consistency" generally refers to causality and the ordering of transactions within a distributed system. Consistency defines rules for operations within the distributed system, such that data stored by the system will remain consistent with respect to read and write operations originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the ranges targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

"Replication zone" generally refers to replicas of data corresponding to databases, tables, rows, indexes, and cluster data, where replication zones may be used to control the number and the location of replicas stored by a cluster of nodes. Using replication zones, a user may control a number of replicas of each range within the cluster, constraints applied to each range, a maximum size of each range, a duration of time for which data included in a range is kept, a location of a range's leaseholder, location(s) of the range's non-leaseholder replicas, a number of voting replicas and non-voting replicas, and locations of voting replicas and non-voting replicas within the cluster. A "replication zone configuration" may correspond to a configuration of a replication zones for replicas of data corresponding to databases, tables, rows, indexes, and cluster data. Replication zone configurations at the cluster, database, table, index, and row level may correspond to a cluster zone configuration, a database zone configuration, a table zone configuration, an index zone configuration, and a row zone configuration, respectively.

Database Overview

A database stored by a cluster of nodes may operate based on one or more remote procedure calls (RPCs). The database may be comprised of a KV store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations that may operate on the distributed KV store.

In some embodiments, as described herein, the KV store of the database may be comprised of one or more ranges. A range may be a configured storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on other nodes such that the range can still be accessed by client devices and replicated to other nodes of the cluster.

In some embodiments, operations directed to KV data as described herein may be executed by one or more transactions. In some cases, a node may receive a read transaction from a client device. A node may receive a write transaction from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read or write transaction that it cannot directly serve, the node may send and/or otherwise route the transaction to the node that can serve the transaction.

In some embodiments, modifications to the data of a range may rely on a consensus protocol to ensure a threshold number of replicas of the range agree to commit the change. The threshold may be a majority of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time (e.g., at a specific timestamp). A timestamp associated with a key (e.g., point key and/or range key) corresponding to KV data may be assigned by a gateway node that received the transaction that wrote and/or otherwise modified the key. For a transaction that wrote and/or modified the respective key, the gateway node (e.g., the node that initially receives a transaction) may determine and assign a timestamp to the transaction based on time of a clock of the node. The transaction may assign the timestamp to the KVs that are subject to the transaction. Timestamps may enable tracking of versions of KVs (e.g., through multi-version concurrency control (MVCC) as to be described herein) and may provide guaranteed transactional isolation. In some cases, additional or alternative methods may be used to assign versions and/or timestamps to keys and respective values.

In some embodiments, a "table descriptor" may correspond to each table of the database, where the table descriptor may contain the schema of the table and may include information associated with the table. Each table descriptor may be stored in a "descriptor table", where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

In some cases, the SQL layer of the database architecture exposes a SQL application programming interface (API) to developers and converts high-level SQL statements into low-level read and write requests to the underlying KV store, which are passed to the transaction layer. The transaction layer of the database architecture can implement support for atomic, consistent, isolated, and durable (ACID) transactions by coordinating concurrent operations. The distribution layer of the database architecture can provide a unified view of a cluster's data. The replication layer of the database architecture can copy data between nodes and ensure consistency between these copies by implementing a consensus algorithm. The storage layer may commit writes from the Raft log to disk (e.g., a computer-readable storage medium on a node), as well as return requested data (e.g., reads) to the replication layer.

Database Architecture

Referring to FIG. 1, an illustrative distributed computing system 100 is presented. The computing system 100 may include a cluster 102. In some cases, the computing system may include one or more additional clusters 102. The cluster 102 may include one or more nodes 120 distributed among one or more geographic regions 110. The geographic regions 110 may correspond to cluster regions and database regions as described further below. A node 120 may be a computing device. In some cases, a node 120 may include at least portions of the computing system as described herein with respect to FIG. 5. As an example, a node 120 may be a server computing device. A region 110 may correspond to a particular building (e.g., a data center), city, state/province, country, geographic region, and/or a subset of any one of the above. A region 110 may include multiple elements, such as a country and a geographic identifier for the country. For example, a region 110 may be indicated by Country=United States and Region=Central, which may indicate a region 110 as the Central United States. As shown in FIG. 1, the cluster 102 may include regions 110*a*, 110*b*, and 110*c*. In some cases, the cluster 102 may include one region 110. In an example, the region 110*a* may be the Eastern United States, the region 110*b* may be the Central United States, and the region 110*c* may be the Western United States. Each region 110 of the cluster 102 may include one or more nodes 120. In some cases, a region 110 may not include any nodes 120. The region 110*a* may include nodes 120*a*, 120*b*, and 120*c*. The region 110*b* may include the nodes 120*d*, 120*e*, and 120*f*. The region 110*c* may include nodes 120*g*, 120*h*, and 120*i*.

Each node 120 of the cluster 102 may be communicatively coupled via one or more networks 112 and 114. In some cases, the cluster 102 may include networks 112*a*, 112*b*, and 112*c*, as well as networks 114*a*, 114*b*, 114*c*, and 114*d*. The networks 112 may include a local area network (LAN), wide area network (WAN), and/or any other suitable network. In some cases, the one or more networks 112 may connect nodes 120 of different regions 110. The nodes 120 of region 110*a* may be connected to the nodes 120 of region 110*b* via a network 112*a*. The nodes 120 of region 110*a* may be connected to the nodes 120 of region 110*c* via a network 112*b*. The nodes 120 of region 110*b* may be connected to the nodes 120 of region 110*c* via a network 112*c*. The networks 114 may include a LAN, WAN, and/or any other suitable network. In some cases, the networks 114 may connect nodes 120 within a region 110. The nodes 120*a*, 120*b*, and 120*c* of the region 110*a* may be interconnected via a network 114*a*. The nodes 120*d*, 120*e*, and 120*f* of the region 110*b* may be interconnected via a network 114*b*. In some cases, the nodes 120 within a region 110 may be connected via one or more different networks 114. The node 120g of the region 110c may be connected to nodes 120h and 120i via a network 114c, while nodes 120h and 120i may be connected via a network 114d. In some cases, the nodes 120 of a region 110 may be located in different geographic locations within the region 110. For example, if region 110a is the Eastern United States, nodes 120a and 120b may be located in New York, while node 120c may be located in Massachusetts.

In some embodiments, the computing system 100 may include one or more client devices 106. The one or more client devices 106 may include one or more computing devices. In some cases, the one or more client devices 106 may each include at least portions of the computing system as described herein with respect to FIG. 5. In an example, the one or more client devices 106 may include laptop computing devices, desktop computing devices, mobile computing devices, tablet computing devices, and/or server computing device. As shown in FIG. 1, the computing system 100 may include client devices 106a, 106b, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN, a WAN, and/or any other suitable network as described herein. As an example, the client devices 106 may communicate with the nodes 120 via a SQL client operating at each respective client device 106. To access and/or otherwise interact with the data stored by the cluster 102, a client device 106 may communicate with a gateway node, which may be a node 120 of the cluster that is closest (e.g., by latency, geographic proximity, and/or any other suitable indication of closeness) to the client device 106. The gateway node may route communications between a client device 106 and any other node 120 of the cluster.

Transaction Execution

In some embodiments, as described herein, distributed transactional databases stored by the cluster of nodes may enable one or more transactions. Each transaction may include one or more requests (e.g., queries) directed to performing one or more operations. In some cases, a request may be a query (e.g., a SQL query). A request may traverse one or more nodes of a cluster to execute the request. A request may interact with (e.g., sequentially interact with) one or more of the following: a SQL client, a load balancer, a gateway, a leaseholder, and/or a Raft Leader as described herein. A SQL client may send a request (e.g., query) to a cluster. The request may be included in a transaction, where the transaction is a read and/or a write transaction as described herein. A load balancer may route the request from the SQL client to the nodes of the cluster. A gateway node may be a node that initially receives the request and/or sends a response to the SQL client. A leaseholder may be a node that serves reads and coordinates writes for a range of keys (e.g., keys indicated in the request) as described herein. A Raft leader may be a node that maintains consensus among the replicas for a range.

A SQL client (e.g., operating at a client device 106a) may send a request (e.g., a SQL request) to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120a) may receive the request from the load balancer. The gateway node may parse the request to determine whether the request is valid. The request may be valid based on conforming to the syntax (e.g., SQL syntax) of the database(s) stored by the cluster. An optimizer operating at the gateway node may generate a number of logically equivalent query plans based on the received request. Each query plan may correspond to a physical operation tree configured to be executed for the query. The optimizer may select an optimal query plan from the number of query plans (e.g., based on a cost model). Based on the completion of request planning, a query execution engine may execute the selected, optimal query plan using a Transaction Coordination Sender (TCS) as described herein. Additional features of query planning and optimization are described further below with respect to "Optimized Query Planning Overview". Additional features of modes for local and distributed query execution are described further below with respect to "Local and Distributed Query Execution".

In some embodiments, a TCS may perform one or more operations as a part of the transaction layer. The TCS may perform KV operations on a database stored by the cluster. The TCS may account for keys indicated and/or otherwise involved in a transaction. The TCS may package KV operations into a Batch Request as described herein, where the Batch Request may be forwarded on to a Distribution Sender (DistSender) of the gateway node.

A DistSender of a gateway node and/or a coordinating node may receive Batch Requests from a TCS of the same node. The DistSender of the gateway node may receive the Batch Request from the TCS. The DistSender may determine the operations indicated by the Batch Request and may determine the node(s) (e.g., the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator, the DistSender may send the next Batch Request for the range corresponding to the provisional acknowledgement. The DistSender may wait to receive acknowledgments for write operations and values for read operations corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write operation in the Batch Request may compare a timestamp of the write operation to the timestamp cache. A timestamp cache may track the highest timestamp (e.g., most recent) for any read operation that a given range has served. The comparison may ensure that the write operation has a higher timestamp than the timestamp cache. If a write operation has a lower timestamp than the timestamp cache, the write operation may be restarted at a timestamp higher than the value of the timestamp cache.

In some embodiments, operations indicated in the Batch Request may be serialized by a latch manager of a leaseholder. For serialization, each write operation may be given a latch on a row. Any read and/or write operations that arrive after the latch has been granted on the row may be required to wait for the write to complete. Based on completion of the write, the latch may be released and the subsequent operations can continue. In some cases, a batch evaluator may ensure that write operations are valid. The batch evaluator may determine whether the write is valid based on the leaseholder's data. The leaseholder's data may be evaluated by the batch evaluator based on the leaseholder coordinating writes to the range. If the batch evaluator determines the write to be valid, the leaseholder may send a provisional acknowledgement to the DistSender of the gateway node, such that the DistSender may begin to send subsequent Batch Requests for the range to the leaseholder.

In some embodiments, operations may read from the local instance of the storage engine as described herein to determine whether write intents are present at a key. If write intents are present, an operation may resolve write intents as described herein. If the operation is a read operation and write intents are not present at the key, the read operation may read the value at the key of the leaseholder's storage engine. Read responses corresponding to a transaction may be aggregated into a Batch Response by the leaseholder. The Batch Response may be sent to the DistSender of the gateway node. If the operation is a write operation and write intents are not present at the key, the KV operations included in the Batch Request that correspond to the write operation may be converted to Raft operations and write intents, such that the write operation may be replicated to the replicas of the range. The leaseholder may propose the Raft operations to the leader replica of the Raft group (e.g., where the leader replica is typically also the leaseholder). Based on the received Raft operations, the leader replica may send the Raft operations to the follower replicas of the Raft group. If a threshold number of the replicas acknowledge the Raft operations (e.g., the write operations), consensus may be achieved such that the Raft operations may be committed to the Raft log of the leader replica and written to the storage engine. The leader replica may send a command to the follower replicas to write the Raft operations the Raft log corresponding to each of the follower replicas. Based on the leader replica committing the Raft operations to the Raft log, the Raft operations (e.g., the write transaction) may be considered to be committed (e.g., implicitly committed as described herein). The gateway node may configure the status transaction record for the transaction corresponding to the Raft operations to committed (e.g., explicitly committed as described herein).

In some embodiments, based on the leader replica appending the Raft operations to the Raft log, the leader replica may send a commit acknowledgement to the DistSender of the gateway node. The DistSender of the gateway node may aggregate commit acknowledgements from each write operation included in the Batch Request. In some cases, the DistSender of the gateway node may aggregate read values for each read operation included in the Batch Request. Based on completion of the operations of the Batch Request, the DistSender may record the success of each transaction in a corresponding transaction record. To record the success of a transaction, the DistSender may check the timestamp cache of the range where the first write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the TCS. The TCS may send the values to the SQL layer. In some cases, the TCS may also send a request to the DistSender, wherein the request includes an indication for the DistSender to convert write intents to committed values (e.g., MVCC values). The SQL layer may send the values as described herein to the SQL client that initiated the request.

Read Transaction Execution

Figure 2A:
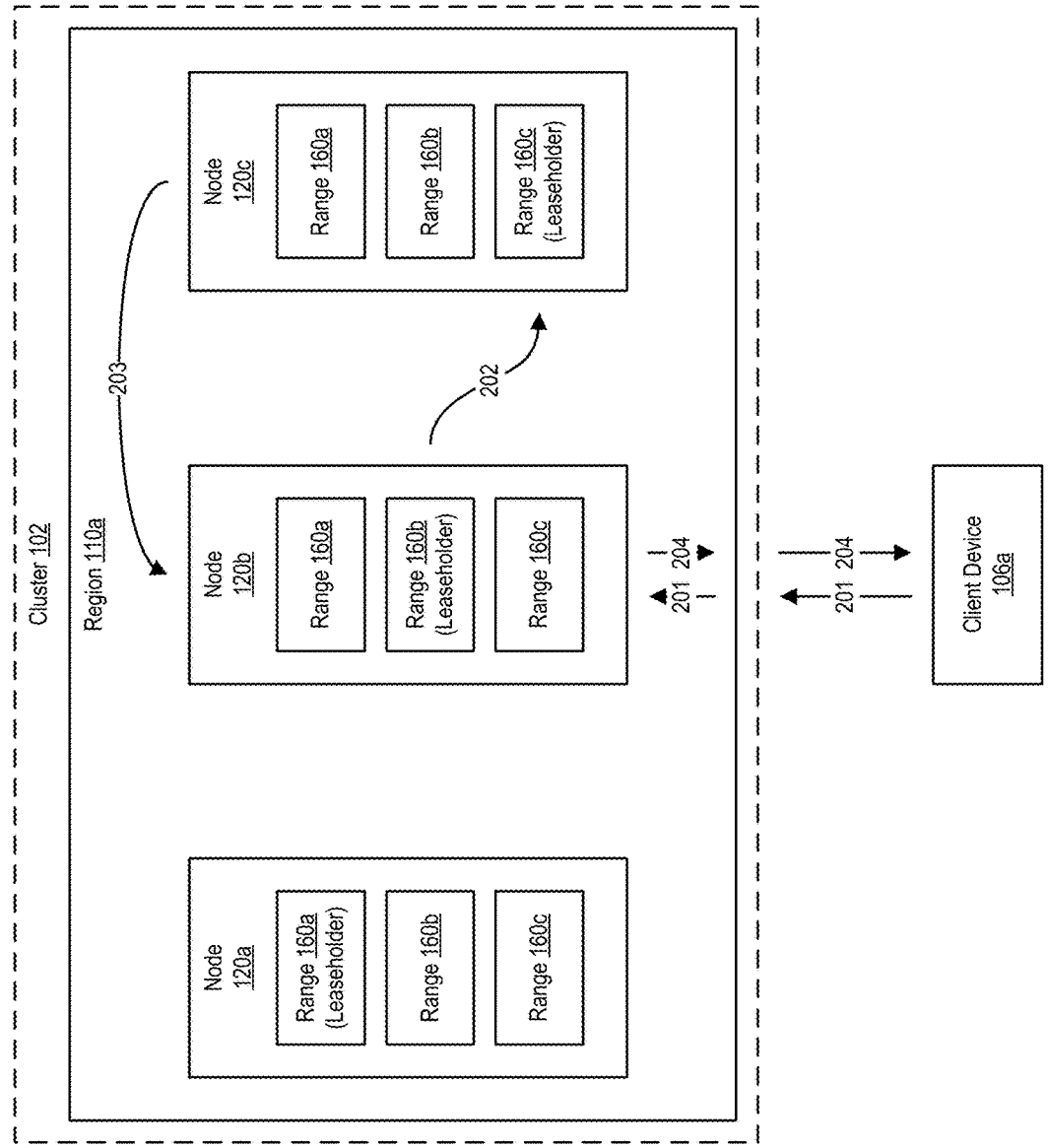
FIG. 2A shows an example of execution of a read transaction at the computing system, according to some embodiments.

Referring to FIG. 2A, an example of execution of a read transaction at the computing system 100 is presented. In some cases, the nodes 120a, 120b, and 120c, of region 110a may include one or more replicas of ranges 160. The node 120a may include replicas of ranges 160a, 160b, and 160c, wherein ranges 160a, 160b, and 160c are different ranges. The node 120a may include the leaseholder replica for range 160a (as indicated by "Leaseholder" in FIG. 2A). The node 120b may include replicas of ranges 160a, 160b, and 160c. The node 120b may include the leaseholder replica for range 160b (as indicated by "Leaseholder" in FIG. 2A). The node 120c may include replicas of ranges 160a, 160b, and 160c. The node 120c may include the leaseholder replica for range 160c (as indicated by "Leaseholder" in FIG. 2A). While FIG. 2A is described with respect to communication between nodes 120 of a single region (e.g., region 110a), a read transaction may operate similarly between nodes 120 located within different geographic regions.

In some embodiments, a client device 106 may initiate a read transaction at a node 120 of the cluster 102. Based on the KVs indicated by the read transaction, the node 120 that initially receives the read transaction (e.g., the gateway node) from the client device 106 may route the read transaction to a leaseholder of the range 160 comprising the KVs indicated by the read transaction. The leaseholder of the range 160 may serve the read transaction and send the read data to the gateway node. The gateway node may send the read data to the client device 106.

As shown in FIG. 2A, at step 201, the client device 106 may send a read transaction to the cluster 102. The read transaction may be received by node 120b as the gateway node. The node 120b may be a node 120 located closest to the client device 106, where the closeness between the nodes 120 and a client device 106 may correspond to a latency and/or a proximity as described herein. The read transaction may be directed to data stored by the range 160c. At step 202, the node 120b may route the received read transaction to node 120c. The read transaction may be routed to node 120c based on the node 120c being the leaseholder of the range 160c. The node 120c may receive the read transaction from node 120b and serve the read transaction from the range 160c. At step 203, the node 120c may send the read data to the node 120b. The node 120c may send the read data to node 120b based on the node 120b being the gateway node for the read transaction. The node 120b may receive the read data from node 120c. At step 204, the node 120b may send the read data to the client device 106*a* to complete the read transaction. If node 120*b* had been configured to include the leaseholder for the range 160*c*, the node 120*b* may have served the read data to the client device directly after step 201, without routing the read transaction to the node 120*c*.

Write Transaction Execution

Figure 2B:
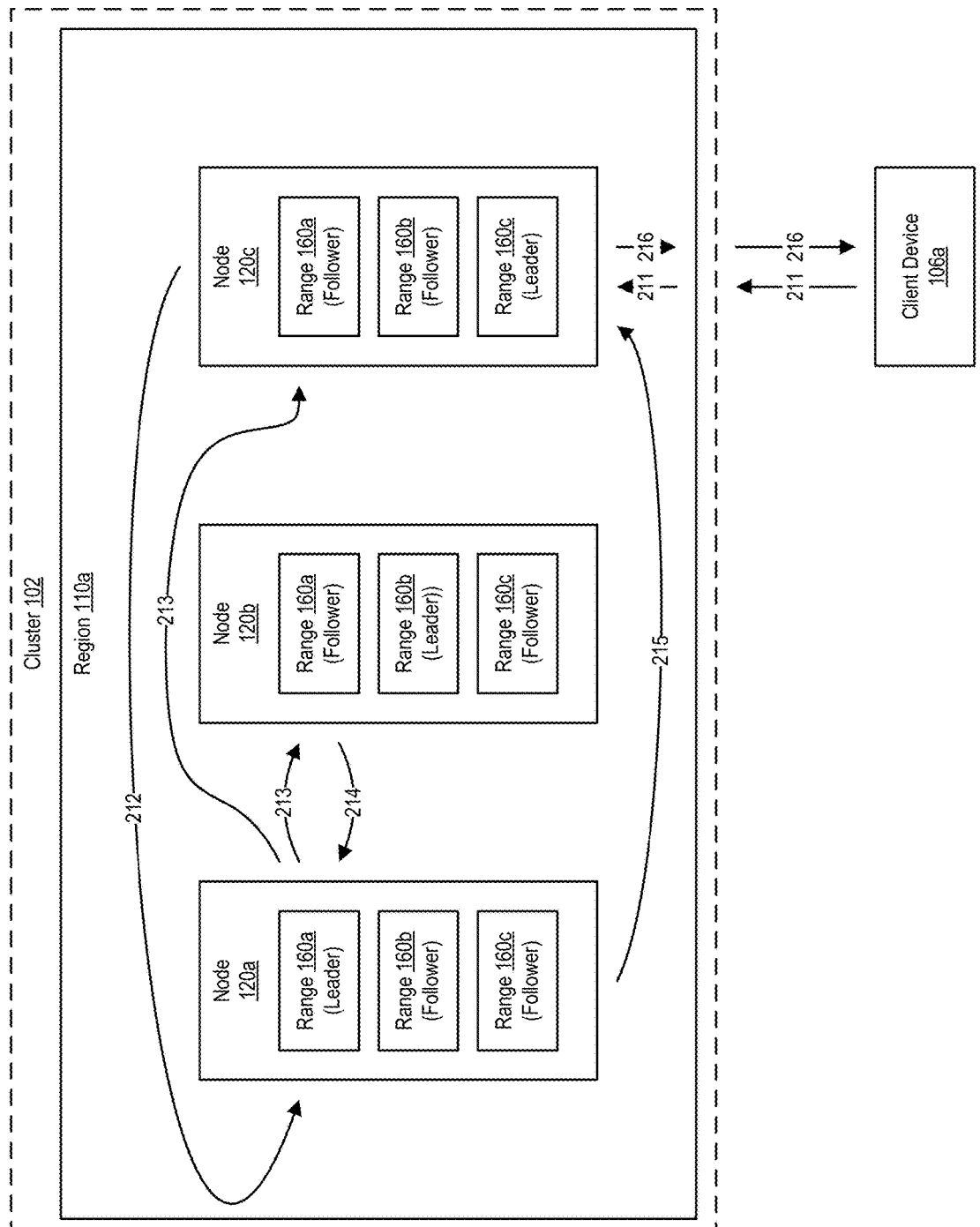
FIG. 2B shows an example of execution of a write transaction at the computing system, according to some embodiments.

Referring to FIG. 2B, an example of execution of a write transaction at the computing system 100 is presented. In some cases, as described herein, the nodes 120*a*, 120*b*, and 120*c*, of region 110*a* may include one or more replicas of ranges 160. The node 120*a* may include replicas of ranges 160*a*, 160*b*, and 160*c*, wherein ranges 160*a*, 160*b*, and 160*c* are different ranges. The node 120*a* may include the leaseholder replica and the leader replica for range 160*a* (as indicated by "Leaseholder" in FIG. 2A and "Leader" in FIG. 2B). The node 120*b* may include replicas of ranges 160*a*, 160*b*, and 160*c*. The node 120*b* may include the leader replica for range 160*b* (as indicated by "Leader" in FIG. 2B). The node 120*c* may include replicas of ranges 160*a*, 160*b*, and 160*c*. The node 120*c* may include the leader replica for range 160*c* (as indicated by "Leader" in FIG. 2B). While FIG. 2B is described with respect to communication between nodes 120 of a single region (e.g., region 110*a*), a write transaction may operate similarly between nodes 120 located within different geographic regions.

In some embodiments, a client device 106 may initiate a write transaction at a node 120 of the cluster 102. Based on the KVs indicated by the write transaction, the node 120 that initially receives the write transaction (e.g., the gateway node) from the client device 106 may route the write transaction to a leaseholder of the range 160 comprising the KVs indicated by the write transaction. The leaseholder of the range 160 may send (e.g., route) the write request to the leader replica of the range 160. In most cases, the leaseholder of the range 160 and the leader replica of the range 160 are the same, such that sending the write request from the leaseholder to the leader replica is not required. The leader replica may append the write transaction to a Raft log of the leader replica and may send the write transaction to the corresponding follower replicas of the range 160 for replication. Follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The gateway node may send the acknowledgement to the client device 106. A voting replica may be a replica of a range that participates (e.g., votes) in the consensus protocol (e.g., Raft protocol) as described herein, such that the voting replica may agree to a modification of (e.g., write to) the range corresponding to the voting replica.

As shown in FIG. 2B, at step 211, the client device 106 may send a write transaction to the cluster 102. The write transaction may be received by node 120*c* as the gateway node. The write transaction may be directed to data stored by the range 160*a*. At step 212, the node 120*c* may route the received write transaction to node 120*a*. The write transaction may be routed to node 120*a* based on the node 120*a* being the leaseholder of the range 160*a*. Based on the node 120*a* including the leader replica for the range 160*a*, the leader replica of range 160*a* may append the write transaction to a Raft log at node 120*a*. At step 213, the leader replica may simultaneously send the write transaction to the follower replicas of range 160*a* on the node 120*b* and the node 120*c*. The node 120*b* and the node 120*c* may append the write transaction to their respective Raft logs. At step 214, the follower replicas of the range 160*a* (e.g., at nodes 120*b* and 120*c*) may send an indication to the leader replica of the range 160*a* that the write transaction was appended to their Raft logs. Based on a threshold number of replicas indicating (e.g., voting) the write transaction was appended to their Raft logs, the leader replica and follower replicas of the range 160*a* may commit the write transaction. At step 215, the node 120*a* may send an acknowledgement of the committed write transaction to the node 120*c*. At step 216, the node 120*c* may send the acknowledgement of the committed write transaction to the client device 106*a* to complete the write transaction.

Voting Replicas and Non-Voting Replicas

In some embodiments, as described herein, voting replicas of a particular range may participate in a consensus protocol (e.g., Raft protocol) to agree to modify (e.g., write) data included in a range. Replicas that do not participate in quorum of the consensus protocol may be referred to as non-voting replicas. According to the consensus protocol, a quorum (e.g., majority) of voting replicas storing a particular range may be required to agree to a modification (e.g., by voting) to commit the modification to the range, where each of the voting replicas participate in the consensus protocol. Typically, this requires that at least 3 nodes of a cluster include a voting replica for a particular range, allowing the range to tolerate a single node failure. In some cases, additional nodes may include a voting replica of a range, such that fault tolerance is improved in the cases of node failures. In some cases, nodes may be configured to serve follower reads, which can enable voting replicas (e.g., follower replicas) to serve stale consistent reads from their respective location without routing read requests to the leaseholder of the range. Such a configuration can result in higher write latencies, as additional replicas (e.g., replicas from different geographic regions) are required by the consensus protocol to agree to a modification (e.g., write) to the range. For applications where the use of additional replicas is meant to allow for follower reads (e.g., rather than for fault-tolerance), these higher write latencies can be undesirable. Non-voting replicas may be used to remedy such a deficiency.

In some embodiments, replicas of a range may be configured as voting replicas or non-voting replicas. A voting replica may be a replica of a range that participates (e.g., votes) in the consensus protocol (e.g., Raft protocol) as described herein, such that the voting replica may agree to a modification of the range corresponding to the voting replica. A non-voting replica may be a replica of a range that does not participate (e.g., vote) in the consensus protocol (e.g., Raft protocol) as described herein, such that the non-voting replica does not participate in agreeing to a modification of the range corresponding to (e.g., stored by) the non-voting replica. Accordingly, non-voting replicas would have a minimal (e.g., negligible) impact on write latencies for the range at the expense of not being able to be used for fault tolerance. Voting and non-voting replicas may enable local follower reads for client devices geographically located in and/or closest to their respective geographic locations (e.g., database regions as described below). In some cases, a client device may be located closest to a particular geographic region (e.g., corresponding to a database region) of a number of geographic regions if the client device is located within the particular geographic region and/or if the client device is closer to the particular geographic region than any other one of the number of geographic regions. For a configuration of the replication layer that enables voting replicas and/or non-voting replicas, the consensus protocol may require that at least 3 nodes of a cluster include voting replicas of a particular range, such that consensus may be achieved among 2 of the 3 nodes in the case of a single node failure. Any suitable number of non-voting replicas may exist for a particular range to enable follower reads at each configured database region of the database. As an example, a quorum of voting replicas may be located in North America, while other non-voting replicas may be located in Europe, Asia, and Australia to enable low-latency follower reads for client devices located at these respective regions and/or located at geographic locations closest to these respective regions. Conventionally, such a configuration of voting replicas would result in high write latencies. One or more replication zone configurations as described below with respect to "Replication Zones" may determine a number and placement of voting replicas and non-voting replicas among nodes of a cluster. As an example, parameters for a number of voting replicas (e.g., num_voters) and voter replica constraints (e.g., voter_constraints) may be configured using replication zone configurations to determine a number and placement of non-voting replicas. In some cases, placement of voting replicas and non-voting replicas among nodes of a cluster may be determined as described below with respect to "Survivability Goals".

Multi-Region Database Overview

In some embodiments, tables (and other schema objects) of a database may be optimized for multi-region applications. In some cases, multi-region databases may include global tables and/or regional tables. As described herein, global tables may be optimized for read access by client devices located in any suitable geographic region. Global tables may be configured to provide low latency read operations to each geographic region, while providing higher latency write operations to each geographic region at the expense of the low latency read operations. Regional tables may be configured to provide performance optimizations for particular geographic locations corresponding to the configured geographic regions of the regional tables. A regional table may provide low latency read and write operations to a configured geographic region corresponding to the regional table, while providing higher latency read and write operations to other geographic regions.

In some embodiments, a database stored by a computing system (e.g., computing system 100) may be configured for multi-region applications, such that data (e.g., table data) stored by nodes within the computing system may be optimized for access (e.g., read and write operations) from one or more configured geographic regions. The computing system may be configured for multi-region applications based on a configuration of cluster regions, database regions, survivability goals, and/or table locality. Cluster regions may be an abstraction (e.g., a high-level abstraction) for a geographic region that a cluster of nodes (e.g., cluster 102) operates within. Each node of a cluster may include a "locality" flag that is indicative of a cluster region (and an availability zone if applicable) corresponding to the node. A cluster region may be a geographic region that includes at least one node of a cluster of nodes. A locality flag for a node may be manually or automatically configured during startup of the node (e.g., based on the geographic location of the node). As an example, a cluster of nodes operating within the state of New York may correspond to an Eastern United States cluster region. Database regions (e.g., as indicated by <region> in SQL syntax) may be an abstraction (e.g., a high-level abstraction) for a geographic region that a particular database operates within, where a database region is selected and/or otherwise configured based on the available cluster regions. As an example, a particular database stored by a cluster of nodes may have one or more nodes operating within the state of New York, which may correspond to an Eastern United States database region configured for the database. A user (e.g., user of a client device 106a) may configure a database region based on (e.g., defined from) one or more available cluster regions corresponding to nodes of the computing system. Survivability goals may correspond to the type of a failure (e.g., node failure) that a particular database can survive. Table locality may correspond to a configuration of a particular table that determines the operation of the table within a multi-region application of the computing system.

In some embodiments, to implement and maintain multi-region databases for the computing system 100, one or more SQL keywords and one or more SQL syntax (e.g., statements) may be used. Examples of SQL keywords that may be used for multi-region databases may include LOCALITY, PRIMARY REGION, SURVIVAL GOAL, REGIONAL BY TABLE IN <region>, REGIONAL BY ROW, and GLOBAL. Examples of SQL syntax that may be used for multi-region databases may include SHOW REGIONS FROM CLUSTER, SHOW REGIONS FROM DATABASE <database>, SHOW SURVIVAL GOAL FROM DATABASE <database>, SHOW CREATE DATABASE <database>, CREATE DATABASE <database> PRIMARY REGION <region> REGIONS <region_list> SURVIVE [REGION ZONE] FAILURE (e.g., SURVIVE REGION FAILURE or SURVIVE ZONE FAILURE), ALTER DATABASE <database>{ADD, DROP} REGION <region>, ALTER DATABASE <database> SET PRIMARY REGION <region>, ALTER DATABASE <database> SURVIVE {REGION, availability zone} FAILURE, CREATE TABLE <table> LOCALITY REGIONAL BY TABLE IN PRIMARY REGION, CREATE TABLE <table> LOCALITY REGIONAL BY TABLE (e.g., which may default to the PRIMARY REGION), CREATE TABLE <table> LOCALITY REGIONAL BY TABLE IN <region>, CREATE TABLE <table> LOCALITY REGIONAL BY ROW, CREATE TABLE <table> GLOBAL, ALTER TABLE <table> SET LOCALITY REGIONAL BY TABLE (e.g., which may default to the PRIMARY REGION), ALTER TABLE <table> SET LOCALITY REGIONAL BY TABLE IN <region>, ALTER TABLE <table> SET LOCALITY REGIONAL BY TABLE IN PRIMARY REGION, ALTER TABLE <table> SET LOCALITY REGIONAL BY ROW, and ALTER TABLE <table> SET LOCALITY GLOBAL. As described herein, <database> may correspond to an identifier for the created/altered database, <table> may correspond to an identifier for the created/altered table, <region> may correspond to an identifier for an available cluster region, and <region_list> may correspond to an identifier for a listing of available cluster regions.

In some embodiments, a cluster region may be defined at the cluster level for a particular database stored by nodes of a computing system (e.g., computing system 100). A cluster region may be defined (e.g., first defined) on startup of a particular node of a cluster. Based on adding an available cluster region to a database (e.g., via one or more SQL statements), the cluster region may be referred to as a database region. Cluster regions available to a database and database regions configured (e.g., defined) for a database may not be identical. As an example, for a particular use case, a developer may choose to add all available cluster regions to a database as database regions. As another example, for a second particular use case, a developer may choose to add only a subset of the available cluster regions to the database as database regions. A user may add and remove database regions from a database as described below with respect to "Configuration of Database Regions".

In some embodiments, a first database region configured for a particular database may be referred to as a "primary region" (and/or a PRIMARY REGION). In some cases, a CREATE DATABASE <database> PRIMARY REGION or an ALTER DATABASE <database> PRIMARY REGION statement (e.g., SQL statement) may be used to create or add a primary region for/to a database. If a primary region is configured for a particular database, the database may be considered a multi-region database. A database may not be considered a multi-region database until a primary region is configured for the database. A user may modify the primary region for a database if the cluster includes at least 2 cluster regions and at least two cluster regions have been added to the database (as database regions). Cluster regions and resulting database regions as described herein may be used to enable table locality and survivability goals as described below. As an example, cluster regions and database regions may be mapped to cloud service provider regions (e.g., Eastern United States, Central United States, Western United States, Western Europe, Eastern Europe, etc.). Geographic placement of nodes within a cluster and the initialized locality for nodes (e.g., indicated by their respective locality flags) may be used to define cluster regions and the resulting database regions. Each of the schema objects (e.g., tables, indexes, etc.) included in a particular multi-region database stored by a cluster of nodes may operate within the defined database regions. Each of the multi-region databases stored by a particular cluster of nodes may operate within different sets of regions (e.g., as limited by the cluster regions). Tables stored by nodes of the computing system 100 may include a configurable locality indicator, where the locality indicator can be configured with an indication of a table's locality (e.g., regional or global), database region (if applicable), and zone (if applicable) as described further below. In some cases, a listing of available cluster regions that be may configured as database regions may be stored by a node status table (e.g., kv_node_status) accessible by each of the nodes of the computing system 100. A database region may be added to a database by configuring the database's locality indicator, where configuring the locality indicator includes providing a string value indicative of a database region (e.g., region=us-west) selected from the available cluster regions. A database region may be referred to as including one or more nodes when the one or more nodes are geographically located within the database region.

In some embodiments, database regions may include one or more sub-tiers referred to as "availability zones". An availability zone may not be explicitly added to and/or removed from a database. A node may be configured as corresponding to a particular availability during node startup using the node's locality flag as described herein. An availability zone may be used to indicate one or more particular failure domains within a cluster region, such that replica placement may adhere to a database's survivability goal as described below. As an example, for a cluster region corresponding to the Eastern United States (e.g., us-east-1), availability zones may include New York (e.g., us-east-1a), Connecticut (e.g., us-east-1b), and New Jersey (e.g., us-east-1c). One or more nodes of a cluster may correspond to a particular availability zone within a cluster region. A node may be configured (e.g., via the locality flag on node startup) as corresponding to a single availability zone. In some cases, a number of nodes corresponding to a cluster region may only be greater than or equal to a second number of nodes corresponding to an availability zone included in the cluster region. A number of nodes corresponding to an availability zone included in a cluster region may only be less than or equal to a second number of nodes corresponding to the cluster region.

In some embodiments, as described herein, survivability goals may correspond to the type of a failure (e.g., node failure) that a particular database can survive. A database may be configured with a particular survivability goal, where each of the tables included in the database operate according to the survivability goal. Survivability goals may include a zone survivability goal (e.g., to survive availability zone failure) and a region survivability goal (e.g., to survive region failure). In some cases, survivability goals may be used to configure a placement of replicas among nodes of a cluster, such that the database will remain available in the event that one or more nodes goes offline and/or is otherwise unavailable. Failure of a node may refer to a node going offline and/or being unavailable, such that data (e.g., KV data) stored by the node is unavailable to client devices and/or other nodes of the cluster. Failure of an availability zone may refer to a failure of each node corresponding to (e.g., included in, geographically located within, etc.) the availability zone. Failure of a database region may refer to a failure of each node corresponding to (e.g., included in, geographically located within, etc.) the database region. Configuring a database with a zone survivability goal may enable the database to remain available for read and write operations if one availability zone failure occurs at a given time within the database region. If more than one availability zone failure occurs at a given time within the database region, the database may be available or unavailable based on the location and the number of availability zones that fail. An availability zone failure may correspond to one or more (e.g., all) of the nodes corresponding to a particular availability zone failing and/or otherwise being unavailable. In some cases, a zone survivability goal may be a default survivability goal for multi-region databases. Configuring a database with a region survivability goal may enable the database to remain available for read and write operations if one database region failure occurs at a given time within the database region. If more than one database region failure occurs at a given time for the database, the database may be available or unavailable based on the database regions that fail. In some cases, if a majority of database regions for the database experience a failure at a particular time, the database may be available based on a number of database nodes included in each respective database region. In some cases, configuring a survivability goal for a multi-region database can negatively impact database performance. As an example, for a database configured with a region survivability goal, write latency may increase by at least as much time as the round trip time (RTT) to a second (e.g., next closest) region from a leader replica stored by a node in a first region.

In some embodiments, to configure nodes of the computing system (e.g., computing system 100) for multi-region applications, a user may configure a "table locality" for tables of the database. A particular table may be configured with a respective table locality that governs how the table operates in a multi-region database configuration. In some cases, a configured table locality may determine one or more optimizations (e.g., latency optimizations) to client devices based on resulting replica types (e.g., voting and non-voting types), replica placement, and table schema configuration corresponding to the configured table locality. A first type of table locality may be a regional locality, such that a table configured with a regional locality indicative of a particular cluster region (and database region) is referred to as a regional table. Examples of cluster regions and database regions may include the Eastern United States (US), Central US, and Western US.

In some embodiments, for a regional table, the regional table may be configured with a database region at the table level or at the row level. A regional table configured with a database region at the table level may be used for applications that require low latency read and write operations for the regional table (e.g., the entire table) in a particular region. As an example, client devices located within (e.g., local to) the database region corresponding to a regional table may experience low latency read and write operations, while client devices located external to (e.g., remote from) the database region corresponding to the regional table may experience higher latency read and write operations at least as large as the network latency between regions. As a default setting for the computing system 100, regional tables may be configured with a database region at the table level (e.g., as table level regional tables) in the database's primary region.

In some embodiments, a regional table configured with one or more database regions at the row level (e.g., a row level regional table) may be used for applications that require low latency read and write operations on a row-by-row basis, where different rows of the regional table may be optimized for access by client devices located in different geographic regions corresponding to the database regions. As an example, client devices (e.g., local client devices) located within a first database region corresponding to a first row of a regional table may experience low latency read and write operations when accessing the first row, while other client devices (e.g., remote client devices) located external to the first database region corresponding to the first row of the regional table may experience higher latency read and write operations when accessing the first row. By configuring database regions on a row level basis for a regional table, the regional table may be configured with partitions that are each optimized for a respective database region. In some cases, a database region configured for rows of a regional table may be automatically or manually configured. With respect to automatic configuration, the database region for a particular row may be configured according to the database region of the gateway node from which the row was inserted. As an example, for a client device that accesses a row level regional table via a gateway node within a database's primary region, a row inserted in the row level regional table without a defined database region may be automatically configured with the primary region as its configured database region. Configuration of database regions for rows of row level regional tables may be configured by modifying (e.g., updating) database regions indicators) stored in the row level regional table's hidden region column as described further in "Multi-Region Table Configuration".

In some embodiments, a second type of table locality may be a global locality, such that a table configured with a global locality (e.g., a locality that is not indicative of a particular database region) is referred to as a global table. A global table stored by a node may be configured to enable low latency read operations and higher latency write operations for a client device located in any suitable geographic region. An example of a global table may be a table storing promotional codes that may be frequently read and infrequently written to by client devices. To configure a particular table as a global table, a locality indicator for the table may be configured as GLOBAL.

In some embodiments, a multi-region database may be required to include a primary region as described herein. The primary region may be required to be configured before (or at the same time as) one or more other cluster regions are added to a database as database regions. By configuring the database with a primary region, the database may be considered a multi-region database, such that the SQL keywords and syntax described herein can be used to interface with the database. A primary region may include one or more differentiating properties relative to other database regions of a database. In some cases, nodes located in the primary region may store each of the leaseholders for global tables included in the database, such that read and write operations directed to global tables are coordinated in the primary region. If the node(s) of the primary region fail and/or are otherwise unavailable, leaseholders for global tables can move to a different database region. In some cases, the primary region for a database may be the default region for regional tables configured with a database region at the table level (e.g., table level regional tables). For a database configured to include a primary region (e.g., making the database a multi-region database), each of the tables included in the database may be regional by table tables configured with the primary region as the database region. If a table is created in a multi-region database (e.g., using CREATE TABLE) and the table is configured as a table level regional table (e.g., a REGIONAL BY TABLE table) without a configured database region, the primary region of the database may be automatically configured as the configured database region for the table level regional table. A configured database region (or a primary region if a database region is not selected) for a table level regional table or a partition of a row level regional table may be referred to as the table's or partition's "home region". If a table is created in a multi-region database (e.g., using CREATE TABLE) and a locality flag not configured (e.g., as regional or global), the table may be automatically configured as a table level regional table and the database region may be automatically configured as the primary region. In some cases, the primary region may be explicitly stated in CREATE TABLE and ALTER TABLE statements. For example, in a CREATE TABLE statement, the primary region may be stated as CREATE TABLE <table> LOCALITY REGIONAL BY TABLE IN PRIMARY REGION, such that the primary region is configured as the database region for a table level regional table directly referencing the primary region (e.g., us-east, us-west, eu-west, etc.).

Survivability Goals

In some embodiments, as described herein, survivability goal may be configured for a multi-region database. A survivability goal may determine a configuration for replica placement among nodes of the cluster. A survivability goal for a database may be configured as zone survivability goal (e.g., configured using SURVIVE ZONE FAILURE) or a region survivability goal (e.g., configured using SURVIVE REGION FAILURE). As described herein, a zone survivability goal may ensure that a database can tolerate (e.g., survive) a failure of at least one availability zone, while a region survivability goal may ensure that the database can tolerate (e.g., survive) a failure of at least one region (e.g., a majority of database regions). A region survivability goal may not be configured for a database having less than 3 database regions. A zone survivability goal may be configured for a database having less than 3 database regions if the database is stored by at least 3 nodes.

In some embodiments, as described herein with respect to "Replication Layer", a quorum of nodes may be required to achieve consensus among nodes to commit a modification (e.g., write or delete) to a replica of a range. Accordingly, a minimum of 3 nodes may be required to include a replica of a particular range such that a quorum of nodes may be able to achieve consensus in the event of a node failure. In some cases, a minimum of 3 nodes may be required to include a replica (e.g., voting replica) for a range included in a database (or each partition corresponding to a row level regional table). One or more replication zone configurations may determine a placement of replicas within a cluster, where the replication zone configurations may cause placement of replicas to adhere to a selected survivability goal for a multi-region database. A configuration of replicas for a survivability goal may be based on a placement of one or more voting replicas and non-voting replicas among nodes of a cluster. For both a region survivability goal and a zone survivability goal, non-voting replicas may be placed in any and/or all database regions that do not include a voting replica, such that the non-voting replicas may enable local follower reads within each database region.

In some embodiments, a database may be configured with a region survivability goal (e.g., SURVIVE REGION FAILURE). For a database configured with a region survivability goal, a minimum of 5 nodes of a cluster may be required to store a voting replica of a particular range and/or table. A database may be required to include at least 3 database regions to be configured with a region survivability goal. Databases that include less than 3 database regions may be not configured with a region survivability goal. In some cases, a minimum of 2 voting replicas (including the leaseholder replica) may be required to be stored by nodes within the database's primary region. A minimum of 2 voting replicas may be required to be stored within the primary region to prevent the need to transfer a range lease to a region other than the primary region in the case of a loss of a node (e.g., due to node failure or restart) in the primary region. In other cases, if the primary region includes only 1 node, the primary region may store a single voting replica. In some cases, voting replicas may be placed among any suitable number of database regions, such that a quorum of voting replicas are external to any single database region and a quorum of voting replicas are available for Raft consensus in the event of a single region failure (e.g., where each of the nodes in the region fail). As an example, for a multi-region database with 2 database regions, configuration of the database with a region survivability goal may fail as a quorum of voting replicas would not be able to be located external to any single database region (e.g., as 3 voting replicas may be stored within the primary region and 2 voting replicas may be stored within a second region). As another example, for a multi-region database with 3 database regions, 2 voting replicas may be stored within the primary region, 2 voting replicas may be stored within a second region, and 1 voting replica may be stored within a third region. In some cases, requiring the primary region to include at least 2 voting replicas may improve database performance. As an example, for a database with 3 database regions (e.g., in a 2-2-1 node configuration), a quorum between replicas (e.g., consensus among a majority of the replicas) may be achieved with replicas from only 2 database regions of the 3 database regions and a quorum between replicas may be achieved when a particular replica on a node that stores 2 replicas is slow, thereby improving write latencies. Read performance can be unaffected in the event of a primary region node failure in this configuration as the leaseholder may remain within the primary region.

In some embodiments, a database may be configured with a zone survivability goal (e.g., SURVIVE ZONE FAILURE). For a database configured with a zone survivability goal, a minimum of 3 nodes of a cluster may be required to store a voting replica of a particular range and/or table, where each of the 3 nodes corresponds to a distinct availability zone. In some cases, a leaseholder and each of the voting replicas (e.g., including the leader replica) for the range may be required to be stored by nodes within a configured database region (or the database's primary region if a database region has not been configured). By requiring 3 nodes of the cluster to each store a voting replica for a particular range, a quorum of voting replicas may remain available for Raft consensus in the event of a single availability zone failure (e.g., where a node corresponding to a particular availability zone fails). By requiring the leaseholder and each of the voting replicas to be stored within a configured database region, the voting replicas may serve low latency reads and writes to client devices within the configured database region.

In some embodiments, voting replicas and/or non-voting replicas may be replaced onto other nodes in the case of node failure. If a node that stored a voting replica for a particular range (or partition for a row level regional table) fails and/or is otherwise unavailable, the voting replica may be replaced and stored by a second node within the same database region as the failed node (if the database region includes the second node). If a node that stored a non-voting replica for a particular range (or partition for a row level regional table) fails and/or is otherwise unavailable, the non-voting replica may be replaced and stored by a second node within the same database region as the failed node (if the database region includes the second node). If a database region including one or more nodes that store only non-voting replicas fails and/or is otherwise unavailable, the failed non-voting replicas may be not replaced onto other nodes of different database regions. If a database region including one or more nodes that store voting replicas fails and/or is otherwise unavailable, the failed voting replicas may be replaced and stored on nodes of one or more other database regions if a quorum of the voting replicas previously existed outside of the failed database region. As an example, for a range with 3 voting replicas stored in a first database region and 2 voting replicas stored in a second database, if the first database region fails, the 3 failed voting replicas of the first database region may not be replaced and stored within the second database region (e.g., even if the second database region includes 3 nodes to store the 3 failed voting replicas). As another example, for a range with 3 voting replicas stored in a first database region and 2 voting replicas stored in a second database, if the second database region fails, the 2 failed voting replicas of the second database region may be replaced and stored within the first database region if the first database region includes 2 additional nodes to store the 2 failed voting replicas.

Multi-Region Table Configuration

In some embodiments, as described herein, a multi-region database may include tables of one or more table localities. Examples of table localities may include tables configured with regional or global localities. Example of regional tables may include a regional table configured with a database region at the table level (e.g., a REGIONAL BY TABLE table) and a regional table configured with database regions at the row level (e.g., a REGIONAL BY ROW table). In some cases, client devices that are located within a particular cluster region and resulting database region corresponding to a table may be "local" to the table. In some cases, client devices that are located external to a particular cluster region and resulting database region corresponding to a table may be "remote" to the table. Table 1 as shown below describes a summary of properties corresponding to regional (e.g., regional by row or regional by table tables and global tables).

TABLE 1

Table Locality Operational Properties

| | Table Locality Type | | |
|---|---|---|---|
| | REGIONAL BY TABLE IN <region> (e.g., table level regional table) | REGIONAL BY ROW (e.g., row level regional table) | GLOBAL (e.g., global table) |
| data locality | Local per <region> | Local per each row's REGION; not local outside of that row's REGION | global |
| data access | read-often, write-often | read-often, write-often | read-mostly, write-rarely |
| local read latency | fast | fast | N/A (remote reads only) |
| local write latency | fast | fast | N/A (remote writes only) |
| remote/global read latency | slow, fast if stale | slow, fast if stale | fast |
| remote/global write latency | slow | slow | slow |
| reads block on local writes, latency | yes, fast | yes, fast | N/A |
| writes block on local writes, latency | yes, fast | yes, fast | N/A |
| reads block on remote/global writes, latency | yes, slow | yes, slow | no, fast |
| writes block on remote/global writes, latency | yes, slow | yes, slow | yes, slow |

In some embodiments, a table level regional table (e.g., a regional table configured with a database region at the table level or a REGIONAL BY TABLE table) may be a default table locality for tables in a multi-region database. Tables of database that do not include a configured table locality (and tables of a database that do not include a table locality when a database region is initially added to the database) may be configured as table level regional tables in the primary region of the database. As described in Table 1, a table level regional table may be a read-often, write-often table that is optimized for low latency read operations and low latency write operations for client devices that are local to the configured database region of the table level regional table. A table level regional table may be considered to be homed in its configured database region. A table level regional table may provide higher latency read operations and higher latency write operations for client devices that are remote to the configured database region of the table level regional table. To create a table level regional table in a database, a client device may provide and/or execute a CREATE TABLE <table> LOCALITY REGIONAL BY TABLE IN <region> statement. To alter an existing table to become a table level regional table, a client device may provide and/or execute an ALTER TABLE <table> SET LOCALITY REGIONAL BY TABLE IN <region> statement. In some cases, the statement IN <region> may be replaced by IN PRIMARY REGION for each of the statements described herein to configure the primary region as the configured region for the table level regional table.

In some embodiments, a table level regional table may include one or more schema changes relative to a table of a database that is not a multi-region database. For a table level regional table configured with a database region other than a primary region of the database, a table descriptor corresponding to the table level regional table may include the configured database region (e.g., an indication of the configured database region). For a table level regional table configured with a primary region of the database, a table descriptor corresponding to the table level regional table may not include the primary region. By not including the primary region in the table descriptor of a table level regional table configured (e.g., automatically configured by default) with the primary region, changes to the primary region may easily propagate to each table level regional table included in the database.

In some embodiments, for a table level regional table, leaseholder(s) for range(s) of the table level regional table may be stored within the database region selected for the table level regional table. A table zone configuration for the table level regional table may constrain and/or otherwise cause the leaseholder(s) for range(s) of the table level regional table to be stored within the selected database region. By constraining the leaseholder(s) to the selected database region, low latency read and write operations may be provided to client devices local to the database region. For a table level regional table in a database configured with a zone survivability goal, a table zone configuration may cause each of the voting replicas of range(s) included in the table level regional table to be stored within the database region selected for the table level regional table. For a table level regional table in a database configured with a region survivability goal, a table zone configuration may cause a quorum (e.g., majority) of voting replicas of the table's range(s) to be stored in database region(s) external to the database region selected for the table level regional table, with remaining voting replicas (e.g., a quorum−1 number of replicas) homed within the configured database region. In some cases, a table zone configuration may cause non-voting replicas of range(s) included in the table level regional table to be stored in any and/or all database regions that do not include a voting replica. If a database region is not explicitly defined for a table level regional table (e.g., such that the primary region of the database is the configured database region), a database zone configuration for the database may provide the replication zone configuration as described herein.

In some embodiments, as described in Table 1, a row level regional table (e.g., a regional table configured with database region(s) at the row level or a REGIONAL BY ROW table) may be a read-often, write-often table that is optimized for low latency read operations and low latency write operations for client devices that are local to the configured database region(s) corresponding to the rows of the row level regional table. A row level regional table may provide higher latency read operations and higher latency write operations for client devices that are remote to the configured database region(s) of the rows of the row level regional table. To create a row level regional table in a database, a client device may provide and/or execute a CREATE TABLE <table> LOCALITY REGIONAL BY ROW statement. To alter an existing table to become a row level regional table, a client device may provide and/or execute an ALTER TABLE <table> SET LOCALITY REGIONAL BY ROW statement.

In some embodiments, a row level regional table may include one or more schema changes relative to a table of a database that is not a multi-region database. In some cases, a row level regional table may include a hidden region column (e.g., crdb_region column) indicative of a configured database region for each row of the row level regional table. The hidden region column may be prepended to a primary key corresponding to the row level regional table. A row level regional table (and its associated primary and secondary indexes) may be partitioned by the hidden region column, where each database region that can be included in the hidden region column may correspond to a respective partition within the row level regional table. Each partition of the row level regional table may be a distinct range stored by one or more voting replicas (and non-voting replicas if applicable). If a database region is added to or removed from a database, each row level regional table (and their corresponding indexes) of the database may be repartitioned to account for each of the database regions that may be applied to rows of the row level regional tables. When a database region is added to a database, an empty partition corresponding to the added database region may be added to each of the existing row level regional tables, where the empty partition may be stored by node(s) located in the added database region. When a database region is removed from a database, an empty partition corresponding to the removed database region may be removed from each of the existing row level regional tables, as the partition may be required to be empty to allow for its removal.

In some embodiments, for a row level regional table, each partition of the row level regional table corresponding to a configured database region may be stored within the respective database region. A replication zone configuration for each partition may constrain the partition to its configured database region. For a row level regional table in a database configured with a zone survivability goal, an index zone configuration for each partition (e.g., range) may cause and/or otherwise constrain leaseholders and voting replicas of each respective partition of the row level regional table to be homed in their respective database region. For a row level regional table in a database configured with a region survivability goal, an index zone configuration for each partition may cause a quorum of voting replicas for each partition (e.g., range) of the row level regional table to be stored external to the respective database region corresponding to the partition. An index zone configuration for each partition may cause the remaining voting replicas for each partition to be stored within the respective database region corresponding to each partition. In some cases, an index zone configuration for each partition may cause non-voting replicas of each partition included in the row level regional table to be stored in any and/or all database regions that do not include a voting replica for the respective partition.

In some embodiments, the configured database region(s) corresponding to a row level regional table may be manually or automatically configured. When a row level regional table is created and database regions are not explicitly defined for the row level regional table, values of the hidden region column may be automatically configured to the database region corresponding to the gateway node used to create the row level regional table. If an existing table (e.g., global table or table level regional table) is altered to a row level regional table, the hidden region column may be added to the table and the values of the hidden region column may be automatically configured to the database region in which the original table was homed and/or otherwise configured. In some cases, for insert operations directed to a row level regional table, value(s) corresponding to the row(s) subject to the insert may be automatically configured to the database region corresponding to the gateway node that receives the insert operations from a client device. In some cases, for insert operations directed to a row level regional table, value(s) corresponding to the row(s) subject to the insert may be automatically configured to the database's primary region if the database region corresponding to the gateway node that receives the insert operations from a client device has not been added to the database. In some cases, for insert operations (e.g., INSERT) directed to a row level regional table that includes a configured database region, value(s) corresponding to the row(s) subject to the insert may be manually configured to the database region indicated in the insert operations. A user may modify a configured region corresponding to a particular row of a row level regional table using an upsert or update (e.g., UPSERT or UPDATE) statement directed to the hidden region column. Modifying a configured database region may cause the row level regional table to repartition to include the modified row in a partition corresponding to the modified database region.

In some embodiments, as described in Table 1, global tables (e.g., GLOBAL table) may be read-mostly, write-rarely tables that are optimized for low latency read operations for client devices in any suitable region, while providing higher latency write operations for client devices in any suitable region. To create a global table in a database, a client device may provide and/or execute a CREATE TABLE <table> GLOBAL statement, where <table> corresponds to an identifier for the created table. To alter an existing table to become a global table, a client device may provide and/or execute an ALTER TABLE <table> SET LOCALITY GLOBAL statement. A global table may not require additional schema changes relative to a table of a database that is not a multi-region database. In some cases, a global table may be indicated as having a global table locality based on a configuration of a Boolean attribute (e.g., global_reads) included in a table zone configuration corresponding to the global table. The configuration of the Boolean attribute may configure whether transactions directed to a table are non-blocking. If a Boolean attribute in a table zone configuration is configured as true, transactions directed to the corresponding table may be non-blocking, such that write transactions are minimally disruptive to concurrent read transactions for the same data. If a Boolean attribute in a table zone configuration is configured as false, transactions directed to the corresponding table may not be non-blocking. In some embodiments, table zone configurations corresponding to global table may include the Boolean attribute configured as true, such that the transaction directed to the global table are non-blocking. For example, as indicated in Table 2, read transactions directed to a global table may not be blocked on concurrent write transactions corresponding to the global table, enabling low latency read operations.

In some embodiments, a table zone configuration for a global table may cause leaseholder(s) of range(s) included in the global table to be stored in the primary region corresponding to the database. By storing the leaseholder(s) of range(s) included in the global table in the database's primary region, deadlock detection may be improved (e.g., through eliminating deadlock detection between regions), locks may be cleaned up more quickly, and behavior of contended transactions may improve. For a global table in a database configured with a zone survivability goal, a table zone configuration may cause voting replicas to be stored and/or otherwise constrained to the primary region of the database. For a global table in a database configured with a region survivability goal, a table zone configuration may cause a quorum (e.g., majority) of voting replicas to be stored in database region(s) external to the primary region of the database, with remaining voting replicas stored within the primary region. In some cases, a table zone configuration may cause non-voting replicas of range(s) included in the global table to be stored in any and/or all database regions that do not include a voting replica. Table 2 shows a summary of exemplary replica placement and database configuration according to selected survivability goals and table locality.

TABLE 2

Replica Placement and Database Configuration

| | Zone Survivability Goal | Region Survivability Goal |
|---|---|---|
| REGIONAL BY TABLE IN <region> (e.g., table level regional table) | At least 3 voting replicas At least 3 availability zones At least 1 database region, Database configured with a primary region Leaseholder and/or leader replica(s) may be stored within a configured database region of the table Each voting replica may be stored within a configured database region of the table A non-voting replica configured to enable follower reads may or may not be included in each database region that does not include a voting replica | At least 5 voting replicas, At least 3 database regions, Database configured with a primary region Leaseholder and/or leader replica(s) may be stored within a configured database region of the table A quorum of voting replicas may be stored external to a configured database region of the table Less than a quorum of voting replicas may be stored within a configured database region of the table A non-voting replica configured to enable follower reads may or may not be included in each database region that does not include a voting replica |
| REGIONAL BY ROW (e.g., row level regional table) | At least 3 voting replicas for each partition of the table At least 3 availability zones At least 1 database region, Database configured with a primary region Partitioned into one or more partitions each corresponding to a respective database region Leaseholder and/or leader replica of each partition may be stored within a configured database region corresponding to the partition Each voting replica corresponding to each partition may be stored within a configured database region corresponding to the respective partition A non-voting replica of each partition of the table configured to enable follower reads may or may | At least 5 voting replicas, At least 3 database regions, Database configured with a primary region Partitioned into one or more partitions each corresponding to a respective database region Leaseholder and/or leader replica of each partition may be stored within a configured database region corresponding to the partition A quorum of voting replicas of each partition may be stored external to a configured database region corresponding to the respective partition Less than a quorum of voting replicas of each partition may be stored within a configured database region corresponding to the respective partition |

TABLE 2-continued

Replica Placement and Database Configuration

| | Zone Survivability Goal | Region Survivability Goal |
|---|---|---|
| | not be included in each database region that does not include a voting replica of the respective partition | A non-voting replica of each partition of the table configured to enable follower reads may or may not be included in each database region that does not include a voting replica of the respective partition |
| GLOBAL (e.g., global table) | At least 3 voting replicas<br>At least 3 availability zones<br>At least 1 database region,<br>Database configured with a primary region<br>Leaseholder replica(s) may be stored within a primary region<br>Each voting replica may be stored within a primary region<br>A non-voting replica configured to enable follower reads may be included in each database region that does not include a voting replica | At least 5 voting replicas,<br>At least 3 database regions,<br>Database configured with a primary region<br>Leaseholder and/or leader replica(s) may be stored within a primary region<br>A quorum of voting replicas may be stored external to a primary region<br>Less than a quorum of voting replicas may be stored within a primary region<br>A non-voting replica configured to enable follower reads may be included in each database region that does not include a voting replica |

In some embodiments, according to replication (e.g., database, table, index, etc.) zone configurations, non-voting replicas may be placed in database regions that do not include a voting replica. To reduce latencies in a multi-region database, non-voting (e.g., follower) replicas may be made available to serve historical (e.g., stale) reads to client devices located within their respective database region, such that read requests may be routed from a gateway node to local follower node for a respective range and do not need to be directed to the leaseholder for the respective range. Historical reads may include transactions with a read timestamp that is sufficiently in the past (e.g., such that write transactions have completed propagating to non-voting replicas). Accordingly, follower reads may be consistent reads at historical (e.g., stale) timestamps from non-leaseholder replicas, which may be enabled by closed timestamp updates. A closed timestamp update may be a data store-wide timestamp, where the timestamp can include per-range information indicative of Raft (e.g., consensus) progress among a leader replica (e.g., typically the leaseholder replica) and follower (e.g., voting) replicas. A leader replica may send a closed-timestamp update to one or more follower nodes, where the closed timestamp update includes a closed timestamp indicative of the time at which the range was most recently updated and/or otherwise modified according to the consensus protocol. Based on received closed timestamp updates, a follower replica may have the necessary information to serve consistent, non-stale reads for timestamps that are at and below the received closed timestamp from the leader replica and serve stale reads for timestamps that are above the received closed timestamp. For ranges configured as non-blocking ranges (e.g., as described with respect to global tables), follower replicas may serve consistent reads at a present time based on receiving a closed timestamp update with a synthetic timestamp. Examples of applications of follower reads and non-blocking transactions can be found in at least U.S. patent application Ser. No. 17/371,403 filed on Jul. 7, 2021 and titled "Methods and Systems For Non-Blocking Transactions", which is hereby incorporated by reference herein in its entirety. In some cases, follower reads may be enabled or disabled based on a placement of replicas according to a replication zone configuration.

Configuration of Database Regions

In some embodiments, as described herein, database regions may be added to and removed from a particular database. Adding a database region to a database may include one or more effects. When a database region is added to a database, a hidden region column corresponding to row level regional tables may be configured to accept and/or otherwise allow an indicator corresponding to the added database region, such that rows of the row level regional tables may be homed in (e.g., optimized for) the added database region. When a database region is added to a database, a non-voting replica for each range of global tables and table level regional tables included in the database may be added to and/or otherwise stored by at least one node corresponding to the added database region. In some cases, when a database region is added to a database, a non-voting replica for each partition of each row level regional table that is homed external to the added database region may be added to and/or otherwise stored by at least one node corresponding to the added database region. By adding and storing the non-voting replicas as described herein, the database may be able serve follower reads for any data stored by the database.

In some embodiments, cluster regions may be made automatically available for configuration as database regions for a database. Cluster regions may be made available as nodes are started and added to a database if the locality flags are configured on node startup. In some cases, adding a database region to a database may affect data values and data placement within nodes of a cluster. Adding a database region may include one or more steps. Before a database region can be added to a database (e.g., using a ALTER DATABASE <database> ADD REGION <region> statement), the database region must be validated as corresponding to a cluster region. To validate that a database region corresponds to a cluster region, the database may query a list of available cluster regions from a node status table (e.g., as stored by the table kv_node_status) to identify that the database region corresponds to an available cluster region.

In some embodiments, based on validating the database region corresponds to an available cluster region, the database region may be added to an enum (enumeration type). As an example, the enum may be named crdb_internal_region. The enum may store each of the database regions corresponding to a database. The enum may allow for validation of database regions added to regional tables and may provide for a compact representation of the database regions included in the hidden region column of a row level regional table. The enum may be created and/or otherwise generated when a first database region is added to a database. The enum may be deleted and/or otherwise destroyed when the last database region is removed from a database. The enum may be stored in a public schema of the database and users may not be able to name a schema object using the same name as the enum. If a database object has the name of the enum before the enum is configured, the database may prevent a user from adding a database region to a database until the database object is renamed. A type descriptor may correspond to the enum, where the type descriptor includes an indication of the primary region of the database. Accordingly, a query and/or other operation corresponding to the primary region may interact with the type descriptor of the enum, rather than a database descriptor of the database.

In some embodiments, database region information for a database may be stored in a database descriptor corresponding to the database. Database regions that are added to or removed from a database may be indicated in the database descriptor. In some cases, the database descriptor may be referenced by a query to show the database regions of the database (e.g., a SHOW REGIONS FROM DATABASE statement). The database descriptor may store an indication of the primary region of the database. As described herein, the primary region may be the configured database region for all tables that are not explicitly configured as global or regional tables.

In some embodiments, based on configuring the enum and database descriptor with the database region, the database region may be added to a database zone configuration for the database. The database zone configuration for a database may be created and/or otherwise generated when a first database region is added to the database. The database zone configuration for a database may be deleted and/or otherwise destroyed when the last database region is removed from the database. Based on the hierarchical properties of replication zone configurations, all tables of the database that do not have a defined table zone configuration may inherit the properties of the database zone configuration. If a database region is added to a database, the added database region may be added to the constraints of the database zone configuration. If a database region added to a database is the first database region of the database (or is modified to be the primary region), the database region may be included in the leaseholder preferences of the database zone configuration.

In some embodiments, as described herein, row level regional tables may be partitioned by each region added to the database, where each partition may be stored and/or otherwise homed in their corresponding database region. Accordingly, when a database region is added to the database, new partitions may be required to be added to each of the row level regional tables (and their corresponding indexes) of the database. A replication zone configuration may be generated and/or otherwise created for each new partition to associate the respective partition to the added database region.

In some embodiments, initially adding a database region to a database (thereby creating a multi-region database) can result in changes to table semantics. Databases conventionally have replicas of ranges spread as broadly among geographic regions as possible to enable improved database resiliency in the event of node failures. With the addition of a first database region to a database, all tables of the database may be converted to table level regional tables. Assuming the database is configured with a zone survivability goal, the voting replicas and the leaseholder corresponding to ranges of the table level regional tables may be moved from their respective locations to the primary region of the database as described herein.

In some embodiments, a database region may be removed and/or otherwise dropped from a database. A database region may only be removed from a database if the database region is no longer in use. To remove a database region from a database, a table level regional table may not be homed in the database region and rows of a row level regional table may not be configured for the database region (e.g., via the hidden region column). If a table level regional table is homed in a database region or rows of a row level regional table are configured for the database region, removal of the database region from the database may be blocked. To drop a database region from a database, a user may provide a command to drop the database (e.g., using an ALTER DATABASE <database> DROP REGION <region> statement). Based on receiving the drop command from the user, the database may validate that the database region may be dropped according to the conditions described herein. Based on receiving the drop command from the user, the database region stored in the enum may be moved to read-only state. Use of the read-only state for the database region may enable the database to validate that no regional tables are homed in the database region to be dropped. If the database determines the database region may be dropped, the database region may be removed from the enum and corresponding type descriptor. If the database determines the database region may not be dropped, the database region may be moved from a read-only state to a public state in the enum. If the database determines the database region may be dropped, all row level regional tables may be configured to drop their respective empty partition corresponding to the database region to be dropped. If the database determines the database region may be dropped, table zone configurations and a database zone configuration corresponding to the database may be modified to remove indications of the dropped database region and to adjust the number of replicas (e.g., voting and non-voting replicas) of ranges. If the database determines the database region may be dropped, the dropped database region and corresponding metadata may be removed from the database descriptor.

Configuration of Replication Zones

In some embodiments, as described herein, replication zone configurations may be a mechanism by which the SQL layer may command and/or otherwise cause the replication and placement of data within a cluster of nodes. One or more parameters corresponding to replication zone configurations may be used to adhere to selected survivability goals, database regions, and table locality. Parameters for replication zones may include constraints on a database, a number of voting replicas for each range/table of a database, constraints on voting replicas, lease preferences for leaseholders, a number of replicas for each range/table of a database, and non-blocking ranges.

In some embodiments, parameters for constraints on a database may be configured at the database level using a database zone configuration. Constraints may be used to configure the database regions in which the database includes replicas. As an example, a user may provide and/or execute a statement "constraints={'+ region=A': 1, '+ region=B': 1, '+ region=C': 1, '+ region=D': 1}" to configure a constraint that causes at least one replica (e.g., voting replica or non-voting replica) to exist (e.g., be stored) in each of the database regions A, B, C and D. Table zone configurations and partition (e.g., index) zone configurations may inherit constraints from the database zone configuration. For multi-region databases, constraints may be configured such that each database region includes at least one replica (e.g., to serve follower reads).

In some embodiments, a parameter for a number of voters (e.g., num_voters) may be configured at the database level using a database zone configuration. For a zone survivability goal, a number of voters may be automatically configured to be 3 (e.g., at least 3) voting replicas. For a region survivability goal, a number of voters may be automatically configured to be 5 (e.g., at least 5) voting replicas.

In some embodiments, parameters for voter constraints (e.g., voter_constraints) and lease preferences (e.g., lease_preferences) may be configured (e.g., automatically configured) at the database level using a database zone configuration for voting replicas corresponding to a table. Parameters for voter constraints and lease preferences may be automatically configured based a selected survivability goal and a selected table locality (and database region if applicable). Voter constraints may correspond to constraining a location of voting replicas to particular database region(s). Lease preferences may correspond to constraining a location of a leaseholder to a particular database region. In some cases, voter constraints and lease preferences may be configured (e.g., automatically configured) at the table level using a table zone configuration for table level regional tables that are not homed and/or otherwise located in the database's primary region. In some cases, voter constraints and lease preferences may be configured (e.g., automatically configured) at the partition level using a partition zone configuration for row level regional tables. For global tables, voter constraints and lease preferences may not be configured at the table level and global tables may inherit voter constraints and lease preferences from a database zone configuration. As an example, for a database configured with a zone survivability goal, voting replicas and a leaseholder may be constrained to database region "A" using statements "voter_constraints={'+ region=A': num_voters}" and "lease_preferences=['+ region=A']". As another example, for a database configured with a region survivability goal, less than a quorum of voting replicas and a leaseholder may be constrained to a database region A using statements "voter_constraints={'+ region=A': num_voters//2}/*floor division*/" and "lease_preferences=['+ region=A']".

In some embodiments, a parameter for a number of replicas (e.g., num_replicas) for a table/range may be configured at the database level using a database zone configuration. As an example, for a database configured with a zone survivability goal, a number of replicas for a table may be configured as "num_replicas=<number of regions>+num_voters−1". As another example, for a database configured with a region survivability goal, a number of replicas for a table may be configured as "num_replicas=max(num_voters, (num_voters//2)+<number of regions>−1)".

In some cases, a parameter for a non-blocking range (e.g., non_blocking_range) may be configured at the table level using a table zone configuration. A parameter for a non-blocking range may correspond to configuring ranges of a particular table as non-blocking, such that KVs of a range modified by a non-blocking write transaction may be readable by concurrent read operations as described herein. The parameter for a non-blocking range may be a Boolean attribute that can be configured as true or false. In some cases, the parameter for a non-blocking range may be configured as true in table zone configurations for all global tables of a multi-region database, such that all global tables have non-blocking ranges. In some cases, the parameter for a non-blocking range may be unconfigured for all other tables of a multi-region database, such that all other tables do not have non-blocking ranges. Other parameters of replication zones (e.g., minimum range size, maximum range size, time until deletion of overwritten values) may be configured independently of multi-region goals (e.g., survivability goals and table locality goals) corresponding to configuration of multi-region databases.

In some embodiments, users may manually configure placement of replicas in the cluster, such that users may override survivability goals and other constraints. A replication zone configuration may include an override parameter (e.g., named override_multi_region_zone_config) that is configured to be false by default. If the override parameter is configured as false and a user configures a parameter of a replication zone configuration that is incompatible with the database's selected survivability goals, the configuration of the parameter may fail. If the override parameter is configured as true and a user configures a parameter of a replication zone configuration that is incompatible with the database's selected survivability goals, the configuration of the parameter may succeed and the user may override the configured constraints of the replication zone configuration. As an example, based on configuring the override parameter as true, a user may manually configure a number of replicas and leaseholder preferences in a database zone configuration. In some cases, if the override parameter is configured as true and a user initiates a change to a multi-region database (e.g., adding new database regions or changing a table's locality), the replication zone configuration, corresponding constraints, and survivability goals may override a user's manual configuration.

Optimization of Voting Replica Placement

In some embodiments, as described herein, a multi-region database may be configured to place replicas (e.g., voting replicas and non-voting replicas) to survive zone failure or region failure based on one or more replication zone configurations. In some cases, voting replicas (e.g., non-leader voting replicas) may be placed to optimize read and write latencies for a multi-region database. For a database configured with a region survivability goal, write transactions would incur cross-region replication latencies, as a quorum of voting replicas may not be located within a particular database region. Accordingly, optimized placement of voting replicas among database regions may improve write latencies within the database.

In some embodiments, an allocator corresponding to the storage (e.g., KV) layer may be configured to place replicas among database regions and nodes of a cluster. Conventionally, the allocator places replicas according to table locality and replication zone configurations, while lacking abilities to place replicas based on their respective latency to their leaseholder. Accordingly, a survive failure attribute (e.g., survive_failure) may be added to the allocator, where the survive failure attribute is a latency-based heuristic (e.g., rule). The survive failure attribute may be configured to one or more values (e.g., values representative of locality tiers). In some cases, the survive failure attribute may be configured to active (e.g., "region"), which may cause the allocator to place replicas within the cluster to optimize resulting write latencies for the data stored by the replicas. In some cases, the survive failure attribute may only be configured to be active if the database is configured for a region survivability goal. If the survive failure attribute is configured to active and the database is configured to a region survivability goal, the allocator may place voting replicas across a maximum of 3 database regions, including the primary region (or database region that includes the leaseholder and/or leader replica) and two other database regions that are the closest to the primary region (or the database region that includes the leaseholder and/or leader replica). The database regions that are the closest to the primary region (or database region that includes the leaseholder and/or leader replica) may be database regions that are the closest in proximity to the primary region of the database (or the database region that includes the leaseholder and/or leader replica) and/or database regions that have the lowest latency to the primary region of the database (or the database region that includes the leaseholder and/or leader replica).

In some embodiments, based on the survive failure attribute being configured as active and the allocator being configured to place voting replicas based on closeness to the primary region, the number of replicas for a particular range may be a dynamic (e.g., changing) value based on the physical state (e.g., the number of database regions) of the cluster. As an example, a cluster may include 7 database regions named database regions A, B, C, D, E, F, and G respectively, where a number of voting replicas for the database is configured to be 5 voting replicas (e.g., num_voters=5). Database region A may be the primary region of the database, where database regions B and C are the closest database regions to the primary region. Accordingly, the allocator may place voting replicas according to a 2-2-1 configuration, where 2 voting replicas (including the leaseholder) are placed in database region A (e.g., the primary region) and the 3 remaining voting replicas are placed among database regions B and C, where database regions B and C each have at least one voting replica. To enable follower reads from each of the database regions as described herein, a non-voting replica may be placed in each of database regions D, E, F, and G, resulting in a total of 9 replicas. Such a configuration may require that database regions A and B each include 2 nodes, which may not exist if each of the database regions A, B, C, D, E, F, and G include 1 node. For a configuration where each of the database regions A, B, C, D, E, F, and G include 1 node, voting replicas may be placed in a 1-1-1-1-1 configuration such that the leaseholder is included in database region A, while 4 other voting replicas are placed in the next 4 closest database regions to the database region A. In some cases, 2 non-voting replicas may be placed in the remaining 2 database regions, such that each database region includes a replica to serve follower reads. Accordingly, the number of replicas (e.g., num_replicas) for a range may vary according to the number nodes included in each database region. To allow to the database to automatically configure the placement of voting replicas and non-voting replicas among nodes to adhere to survivability goals and to serving follower reads (e.g., low-latency follower reads) from each database region, the parameter for a number of replicas (e.g., num_replicas) included in a replication zone configuration may be configured to automatic (e.g., num_replicas=auto), such that the allocator may dynamically determine a number of replicas needed to adhere to constraints of the database. The allocator may automatically determine a number of replicas for a database based on a selected number of voting replicas, a selected survivability goal, and one or more replication zone configurations for a database. The allocator may determine a minimum number of replicas to adhere to the constraints as described, such that the allocator does not configure more than a required number of replicas to adhere to constraints.

Multi-Region Database Configuration

In some embodiments, as described herein, users may use one or more SQL keywords and SQL syntax to configure multi-region databases stored by a cluster of nodes. To identify cluster regions available to a particular database, a client device (e.g., coupled to the cluster 102) communicatively coupled to the database may provide and/or execute a SHOW REGIONS FROM CLUSTER statement. Based on executing the statement, the database may return a listing of one or more cluster regions and one or more associated availability zones to the client device. The one or more cluster regions may be indicative of geographic regions corresponding to the locations of the nodes that store the database. The one or more availability zones may be configured for individual nodes corresponding to each of the cluster regions, where each node can be configured as corresponding to a particular availability zone and each availability zone can include one or more nodes. In some cases, based on identifying one or more cluster regions available to a particular database, a user may add a database region to the database (e.g., thereby making the database a multi-region database). To add a database region to the database, a client device may provide and/or execute an ALTER DATABASE <database> ADD REGION <region> statement, where <database> corresponds to an identifier for the database and <region> corresponds to an identifier for an available cluster region. If the added region is the first region added to the database, the added region may be the primary region for the database. To add a new cluster region to a cluster, a user may startup a new node corresponding to the new cluster regions and may define the cluster region and an availability zone using the node's locality flag. For example, a user may define the locality flag as "--locality=region=us-east-1,zone-us-east-1a", such that a cluster region corresponding to the Eastern United States is available for configuration as a database region (e.g., using an ALTER DATABASE <database> ADD REGION <region> statement). In some cases, based on adding database regions to the database, a user may view the active database regions of the database. To view the active database regions for the database, a client device may provide and/or execute a SHOW REGIONS FROM DATABASE <database> statement. Based on executing the statement, the database may return a listing of one or more database regions and one or more associated availability zones that are active for the database to the client device.

In some embodiments, to configure a region survivability goal for a database, a client device may provide and/or execute an ALTER DATABASE <database> SURVIVE REGION FAILURE statement. Accordingly, the database may adhere to a region survivability goal and may place replicas in the respective database regions that are necessary to maintain region survivability. In some cases, to configure an existing table to a global table, a client device may provide and/or execute an ALTER TABLE <table> SET LOCALITY GLOBAL statement, which may cause the table to be homed in the database's primary region a non-blocking table and serve low latency reads. To configure an existing table as a row level regional table, a client device may provide and/or execute an ALTER TABLE <table> SET LOCALITY REGIONAL BY ROW statement, which may cause the hidden region column to the added to the table. A backfill operation may cause the hidden region column to be added to each replica of the table, where each row of the hidden region column is configured to the primary region of the database. Subsequent insert operations directed to the row level regional table may configure the database region(s) of row(s) subject to the inserts as the database region corresponding to the gateway node (unless the database region is explicitly configured in the insert operations). To reconfigure the primary region of a database, a client device may provide and/or execute an ALTER DATABASE <database> SET PRIMARY REGION <region> statement. Each table level regional table configured for the primary region may be homed in the new primary region of the database after execution of the above statement to reconfigure the primary region of the database. To reconfigure a configured database region for a table level regional table to a database region other than the primary region, a client device may provide and/or execute an ALTER TABLE <table> SET LOCALITY REGIONAL BY TABLE IN <region> statement.

Further descriptions of multi-region databases can be found in at least U.S. patent application Ser. No. 17/978,752 filed on Nov. 1, 2022 and titled "MULTI-REGION DATABASE SYSTEMS AND METHODS", which is hereby incorporated by reference herein in its entirety.

Optimized Query Planning Overview

Relational query languages (e.g., such as SQL) provide a high-level declarative interface to access data (e.g., KV data) stored in a relational database, such as a database stored by a computing system (e.g., computing system 100) as described herein. Components of the query evaluation component of a computing system storing a database can include an optimizer and a query execution engine. The query execution engine can implement a set of physical operators corresponding to physical operations executed at nodes of a cluster that are required to coordinate and/or communicate to execute a query plan for a particular query. Execution of a query may refer to accessing data (e.g., row(s) of KV data from a table), processing the data (e.g., using physical operation(s)), modifying a state of the data and/or database storing the data (e.g., for a write query), and/or providing a response for the query to a client device from which the query originated. A physical operator may receive one or more data streams (e.g., row(s) of KV data from a table) as an input and may produce an output data stream based on the received data streams and physical operation(s) corresponding to the physical operator. Some non-limiting examples of physical operators include external sort, sequential scan, index scan, nested-loop join, and sort-merge join operators. Such operators may be referred to herein as physical operators based on the operators not corresponding "one-to-one" with relational operators. Such physical operators can be computer-readable instructions that operate as "building blocks" for enabling execution of queries (e.g., SQL queries).

Figure 3:
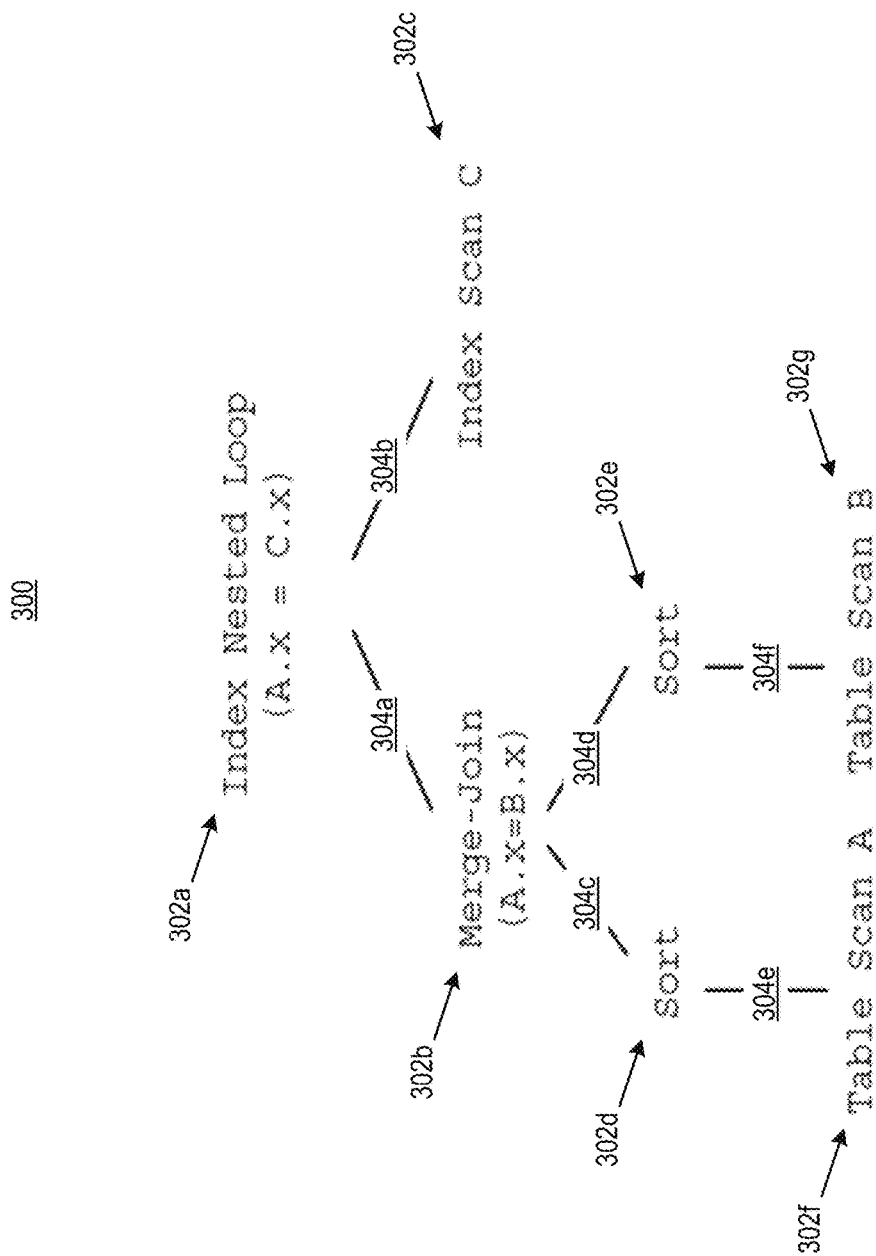
FIG. 3 shows an exemplary physical operation tree for a query, according to some embodiments.

In some embodiments, a physical operation tree may provide an abstract representation of an execution of a query. FIG. 3 illustrates an exemplary physical operation tree 300 for a query. The physical operation tree 300 is one example of a number of logically equivalent, physical operation trees that may be generated for a particular query. The operation tree 300 includes one or more operators 302 and one or more edges 304. As an example, the operation tree 300 may be representative of a query for an index nested loop join as indicated by the operator 302a. The operators 302 may be physical operators as described herein. The edges 304 may represent a flow of data among the operators 302 and/or an order of execution of the operators 302, where data (e.g., data input to the physical operator(s)) moves upward from the bottom-level operations (e.g., operations 302c, 302f, and 302g) of the operation tree 300 to the top level operation (operation 302a) of the operation tree 300 as the operations 302 perform respective physical operations on the data. In the example of FIG. 3, an operation tree 300 for a received query (e.g., SQL query) may include operators 302a, 302b, 302c, 303d, 302e, 302f, and 302g (collectively referred to herein as operators 302). In the example of FIG. 3, an operation tree 300 for a received query (e.g., SQL) query may include edges 304a, 304b, 304c, 304d, 304e, and 304f (collectively referred to herein as edges 304). In some embodiments, the query execution engine may execute a query plan defined according to an operation tree (e.g., operation tree 300). Capabilities of the query execution engine can determine the structures of operation trees that may be executed for a query.

In some embodiments, operators 302 of an operation tree 300 may be referred to as source and/or sink operators. Source operators may transfer data to sink operators as part of an order of execution of the operators 302 described herein. A source operator may be connected to a sink operator by an edge 304, where an output of a physical operation corresponding to the source operator is provided as an input to a physical operation of a sink operator during execution of the operation tree 300 (e.g., by query execution engines of respective node(s)). As an example, the operator 302d may be a source operator and the operator 302b may be a sink operator, where the edge 304c represents a flow of data from the operator 302d to the operator 302b. A source operation may refer to a physical operation of a source operator and a sink operation may refer to a physical operation of a sink operator. An operator 302 may be a source operator, a sink operator, and/or a source and sink operator based on connections (e.g., via edges 304) of the operator 302 to other operators 302.

In some cases, an operation tree 300 may be referred to as including one or more paths, where a path is defined from the top level operation (referred to as a "root") of the operation tree 300 to a particular bottom level operation (referred to as a "leaf") of the operation tree. In the example of the operation tree 300, a first path may correspond to the operators 302f, 302d, and 302b, and 302a as connected in order by the edges 304e, 304c, and 304a. A second path may correspond to the operators 302g, 302e, and 302b, and 302a as connected in order by the edges 304f, 304d, and 304a. With respect to a latency cost for a candidate query plan corresponding to an operation tree 300, a latency cost may be determined between pairs of source and sink operators included in each respective path of the operation tree 300, where the operation tree 300 has a latency cost equivalent to the latency cost of the individual path of the operation tree 300 that has the largest latency cost. The latency cost for a particular path of the operation tree 300 may be a sum of individual latency costs for pairs of source and sink operators included in the path as described herein. A distribute operator may be included between source and sink operators including distribution properties (e.g., input and output distribution properties) indicative of different database regions, such that the distribute operator may enforce the distribution to the database regions indicated by the distribution properties.

In some embodiments, the optimizer may generate the input for the query execution engine. The optimizer may receive an indication (e.g., parsed representation) of a query (e.g., SQL query) as an input. Based on the received indication of the query, the optimizer may generate one or more candidate query plans for the query. Each candidate query plan includes and/or corresponds to a distinct generated physical operation tree. Each of the physical operation trees corresponding to the candidate query plans may include one or more logically-equivalent physical operations for a respective logical operation corresponding to the query. In some cases, each of the physical operation trees may be generated based on logical operations included in a logical operation tree corresponding to the query, where physical operation trees may include logically-equivalent physical operation choices in place of the logical operations.

In some embodiments, based on a cost model included with and/or available to the optimizer, the optimizer may determine respective costs of each of the candidate query plans and may select an optimal (e.g., most-efficient, lowest cost, etc.) candidate query plan. The optimal candidate query plan may be the candidate query plan having the lowest cost as defined by the cost model. In some cases, the cost model may define a cost of a candidate query plan as a computational cost and/or a throughput for the candidate query plan. A computational cost of a query plan may be defined based on one or more of processor (e.g., CPU) utilization, I/O bandwidth utilization, and/or memory utilization for the node(s) impacted by the candidate query plan. Node(s) referred to as "impacted" and/or "affected" by a candidate query plan may be node(s) that are required to communicate and/or coordinate with the gateway node to execute a particular query. A particular query may be referred to as "directed to" a database region when a candidate query plan for the query requires that a gateway node for the query communicate and/or coordinate (e.g., send and/or receive data) with node(s) geographically located in the database region to execute the query. Communication between nodes may be direct communication (e.g., node-to-node communication via one or more networks) and/or indirect communication (node-to-node communication via one or more networks and one or more intermediate nodes). In some cases, node(s) geographically located in different groups of database regions may be impacted by different query plans. Based on selecting the optimal query plan, the optimizer may provide the optimal query plan to the query execution engine for execution as described herein. The optimizer may determine a cost of each candidate query plan based on the properties (e.g., edges) and operators of the operation tree of the respective candidate query plan using the cost model. Additional features for determining costs of candidate query plans are described further below with respect to "Locality-Aware Cost Model".

In some embodiments, query optimization by an optimizer may be based on a (i) a number of generated candidate query plans; (ii) a cost model for estimating a cost of each of the candidate query plans; and (iii) a enumeration algorithm for searching and selecting from the candidate query plans and based on the respective costs of the candidate query plans. Accordingly, a preferred optimizer may: generate candidate query plans with low costs, include a cost model that accurately estimates costs of candidate query plans, and include an efficient enumeration algorithm for selecting the optimal query plan from the candidate query plans.

Local and Distributed Query Execution

In some embodiments, query execution (e.g., SQL query execution) for the computing system and database architecture described herein may be executed in one of two modes, including: (i) a gateway node-only mode (also referred to as a local mode), in which the gateway node that planned the query is responsible for all SQL processing for the query, or (ii) a distributed mode, in which one or more other nodes of the cluster participate in SQL processing. Based on the distribution layer of the database architecture described herein presenting an abstraction of a single, monolithic key space, the SQL layer can perform read and write operations for any range stored by any particular node. Such operations enable SQL operators to behave identically whether planned by a physical planner in gateway-only or distributed mode. In some cases, selection of the local or distributed mode for execution of a particular query may be made by a heuristic that estimates a quantity of data that would need to be communicated over a network connecting nodes. In some cases, queries that only read a small number of rows may be executed in gateway-only mode. To produce a distributed query plan from a selected query plan as described herein, a physical planner operating at a gateway node may execute a physical planning stage that transforms a selected query plan generated by a query optimizer into a directed acyclic graph (DAG) of physical operators.

In some embodiments, for a local mode, a gateway node that receives a query may cause execution of a candidate query plan that executes the operations of a selected query plan on the gateway node, where operations can include fetching data (e.g., row(s) of tables) from nodes storing the data subject to the query. In some cases, such nodes can be located in the database region of the gateway node and/or in database regions external to the database region of the gateway node. With respect to a local execution mode, latency costs associated with a candidate query plan (if applicable) may only be based on latencies between the database region of the gateway node and one or more database regions external to the database region of the gateway node from which the gateway node may fetch data stored by nodes.

In some embodiments, for a distributed mode, a gateway node that receives a query may coordinate with SQL processors on other nodes to cause execution of a candidate query plan and related physical plan, where the gateway node and other nodes may perform operations according to the physical plan. In some cases, such other nodes can be located in database regions external to the database region of the gateway node. With respect to a distributed execution mode, latency costs associated with a candidate query plan may be based on: (i) pairwise latencies between the database region of the gateway node and one or more database regions external to the database region of the gateway node; and optionally (ii) pairwise latencies between pairs of one or more of the database regions external to the database region of the gateway node, where the pairs of one or more of the database regions external to the database region of the gateway node may be required to communicate for execution of the query. The database regions external to the database region of the gateway node may be database regions that include SQL processors that execute operations corresponding to the query.

In some embodiments, a distribution property as described herein with respect to a locality-aware query optimizer may be used to indicate database regions that may be impacted by a query plan for a query executing in the local or distributed execution modes. Such indications of the database regions may be used to determine pairwise latencies between database regions that are required to communicate and/or coordinate for execution of the query plan, where the locality-aware optimizer may determine latency costs for the query plan based on the determined pairwise latencies. Distribution properties may include an input distribution property and an output distribution property corresponding to a source operator and sink operator, respectively, as described herein.

Locality-Optimized Query Planning

Multi-region abstractions (e.g., SQL abstractions) enable design and use of schemas (e.g., tables) that adhere to latency goals for particular localities (e.g., database regions). For example, table level regional tables and/or partitions of row level regional tables may be homed in a selected home database region and/or a primary region of a multi-region database. Based on the geographically distributed data of such multi-region implementations, a locality-aware optimizer for generating and selecting optimal query plans may be needed to efficiently execute queries received at the database (e.g., as a part of transactions as described herein).

In some embodiments, as described herein, from a logical operation tree that indicates the logical operations required to execute the query, an optimizer may generate a number of candidate query plans including respective physical operation trees to be executed by a query execution engine. For the optimizer, the optimization goal can be to determine a lowest cost query plan (e.g., defined according to the generated physical operation tree), where a cost of a query plan is defined based on computational resources consumed by the query plan and/or an execution time for the query plan. For execution of any particular physical operation, the inter-region latency (e.g., defined as round-trip per-physical operation communication delay between a pair of nodes) can vary widely between database regions. For example, a latency between a first database region (e.g., Eastern United States) and a second database region (e.g., Central United States) may be much lower than another latency between the first database region and a third database region (e.g., Western Europe). To reflect the maximum latency incurred by a particular physical operation, database regions that are accessed by a source physical operation and/or requiring distribution for a sink physical operation may be included (e.g., identified or indicated) in the physical operation tree. The locality-aware optimizer may determine latency costs associated with data transfer between database regions corresponding to source and sink operations.

In some embodiments, to enable locality-aware query planning and execution as described herein, one or more new features may be included in candidate query plans generated by a locality-aware optimizer. In some cases, a "distribution" physical property may indicate the database regions accessed by a source relational operator (e.g., source operator) included in physical operation trees of candidate query plans. In some cases, a "distribute" operator may be configured to enforce a required distribution of row(s) of a table (e.g., regional table) to database regions by a sink relational operator (e.g., sink operator) included in physical operation trees of candidate query plans.

In some embodiments, a locality-aware optimizer described herein may use a locality-aware cost model that includes indications of latencies between pairs of database regions in evaluating costs of candidate query plans. The locality-aware cost model may use the physical distribute operator to evaluate latency-related costs of candidate query plans. One or more locality-aware (e.g., with respect to placement of data according to database regions) transformations included in the locality-aware optimizer may use the locality-aware cost model described herein.

In some embodiments, SQL clients (e.g., SQL clients operating at client devices 106) may include a locality-optimized session mode. The locality-optimized session mode may cause optimized execution of queries for latency (based on the locality-aware optimizer and locality-aware cost model described herein). When the locality-optimized session mode is enabled for a SQL client, the session mode may cause queries (e.g., all queries) initiated using the session mode to access and execute in only the database region corresponding to a gateway node with which the SQL client communicates. When a query is initiated using the locality-optimized session mode of the SQL client and requires access to data geographically located in a database region different from the database region of the gateway node, the SQL client may receive an indication of an error for the query from the gateway node and the query may not execute.

Distribution Physical Property

In some embodiments, physical properties can be used in query optimization to track one or more properties of a relational expression (e.g., such as a physical operator), where the one or more properties of the relational expression enable proper execution of physical operators included in a physical operation tree and are not included in the relational model. In some cases, a physical property may be any characteristic of a candidate query plan that (i) is not shared by all candidate query plans for the same logical expression; and (ii) can impact the cost of subsequent operations of the candidate query plan. An example of a physical property is an ordering property, which can be used for proper execution of SQL (e.g., when a query requests ordering using an ORDER BY clause) and certain types of physical operators. For example, physical join and aggregation operators such as merge join and streaming GROUP BY require that the input to the operator is sorted on the join keys or the grouping columns, respectively.

In some embodiments, the distribution property may be used to track data distribution for a distributed database that is stored among one or more localities (e.g., database regions), such as the multi-region database described herein. In some cases, the distribution property may indicate each of the distinct localities (e.g., database regions) that may be impacted by a given physical operation of the physical operation tree of a candidate query plan. As an example, a query corresponding to full search over a table stored as replicas in database regions for the Eastern United States and Western United States can have a distribution property that indicates both the Eastern United States and Western United States. Such a distribution property can indicate required communication and/or coordination between node(s) geographically located in the Eastern United States and Western United States database regions for execution of the query. As another example, a query corresponding to a lookup join that must read (e.g., fetch) data stored in a database region for Western Europe can have a distribution property that indicates Western Europe. A database region that includes a gateway node may or may not be indicated by a distribution property. As an example, a distribution property for a physical operation may only indicate the database region including a gateway node when the database region is affected by the physical operation, such that node(s) included in the database region are required for execution of the physical operation.

As an example in a multi-region deployment, a row level regional table may include respective replicas of partitions stored in database regions for the United States, Europe, and Canada. A first partition of the row level regional table may be homed in the United States, a second partition of the row level regional table may be homed in Europe, and a third partition of the row level regional table may be homed in Canada. For a query corresponding to a scan operation (e.g., using a SELECT statement) to read the row(s) of the each of the first, second, and third partitions, a distribution property included in an operation tree for the query may indicate each of the database regions for the United States, Europe, and Canada. For a query corresponding to a scan operation to read the row(s) of only the first partition, a distribution property included in an operation tree for the query may indicate only the database region for the United States.

In some embodiments, a distribution property may be an input distribution property or an output distribution property. Database regions indicated by an input distribution property may correspond to the database regions from which data (e.g., row(s) of table(s)) is received as an input for a physical operation. Database regions indicated by an output distribution property may correspond to the database regions to which data (e.g., row(s) of table(s)) is provided as an output from a physical operation. A distribute operator as described herein may include an input distribution property and an output distribution property. An input distribution property may be a distribution property corresponding to a source operation. An input distribution property may indicate database regions from which data (e.g., row(s) of table(s)) is received as an input for a sink operation. An output distribution property may be a distribution property corresponding to a sink operation. An output distribution property may indicate database regions to which data (e.g., row(s) of table(s)) is provided (e.g., sent) as an output from a source operation.

Distribute Operator

In some embodiments, an optimizer can enforce that the query execution engine practices required physical properties for query execution (e.g., such as a distribution property) by using particular physical operators (referred to as "enforcers") in operation trees. As an example, the ordering physical property can be enforced for a query using a "sort" operator that sorts and orders data (e.g., by alphanumeric order) on which the query operates. A cost model of the optimizer may evaluate and determine costs of enforcers as a part of a cost of candidate query plan, thereby enabling the optimizer to account for enforcer-related costs when selecting the optimal query plan from a number of candidate query plans.

In some embodiments, a distribute operator may be used to enforce the distribution properties described herein, such that a candidate query plan is configured to execute at nodes located in the database regions indicated by a distribution property. A candidate query plan and/or a corresponding query may be referred to as "executing" at a particular node when the query is required to communicate with the node to execute the query. A distribute operator may model processes for communicating (e.g., sending and receiving) data between database regions using one or more networks (e.g., networks 112), such that a resulting distribution of physical operations of a candidate query plan to node(s) complies with the required distribution of a sink operator of the distribute operator in a physical operation tree of the candidate query plan.

In an example, a distribution property enforced by the distribute operator may be a requirement that results for a query be returned to the node and database region (e.g., Canada) hosting a SQL connection with a SQL client (e.g., operating at a client device) that initiated the query. A gateway node that received the query from the SQL client may host a SQL connection with the SQL client. For such a query, the optimizer may generate a candidate query plan including a physical operation tree. A top-level operation (e.g., operation 302a) included in the physical operation tree (e.g., operation tree 300) may include an indication (e.g., annotation) of a required distribution for the database region (e.g., Canada) hosting the SQL connection. The indication of the required distribution may cause results for the query to be returned to the gateway node, where the gateway node may send the results to the SQL client that initiated the query. In some cases, if a particular operation underlying the top-level operation of the physical operation tree includes a distribution property indicating database region(s) (e.g., United States and Europe) other than the database region of the gateway node hosting the SQL connection, a distribute operator may be applied between the top-level operation and the particular operation of the physical operation tree, where the distribute operator is connected to the top-level operation and the particular operation by a first and second edge, respectively.

To determine a cost of the distribute operator for the example operation tree described herein, the optimizer may determine latencies (e.g., round trip times) between the database region hosting the SQL connection (e.g., indicated by an output distribution property enforced by the distribute operator) and each other database region indicated by the distribution property (e.g., input distribution property). For example, when a database region of Canada that hosts the SQL connection is indicated by an output distribution property and other database regions of United States and Europe are indicated by an input distribution property, the optimizer may determine latencies between (i) Canada and the United States; and (ii) Canada and Europe. Based on determining the latencies between the database region hosting the SQL connection and each other database region indicated by the input distribution property, the optimizer may identify the largest latency from the determined latencies. For example, the optimizer may determine that the latency between Canada and Europe is larger than the latency between Canada and the United States and the optimizer may identify and use the latency between Canada and Europe to determine the latency cost for the distribute operator. The optimizer may use the identified largest latency to determine a latency cost for the particular distribute operator of the operation tree including the input and output distribution properties described herein, where the latency cost may be used by the locality-aware cost model for determining a cost of the candidate query plan corresponding to the operation tree.

In some embodiments, latency costs may be individually determined based on database regions indicated by input and output distribution properties of physical operators that are enforced by a distribute operator connected between the physical operators. When an operation tree includes more than one distribute operator on any particular path of the operation tree, a latency cost for the particular path may be a sum of the individual latency costs for each of the distribute operators included in the path. A latency cost for an individual distribute operator may be the largest pairwise latency between database regions indicated in the input and output distribution properties of a source and sink operator between which the distribute operator is connected by edges. The locality-aware optimizer may determine a latency cost for each path included in an operation tree based on distribute operator(s) included in each respective path. The locality aware optimizer may determine a latency cost of an operation tree to be equivalent to a latency cost of the path of the operation tree that has the largest latency cost. Additional features for determining latencies between database regions are described further below with respect to "Locality-Aware Cost Model".

In some embodiments, one or more distribution operations corresponding to the distribute operator may be used (e.g., required) to prepare inputs to physical operations of an operation tree, such as to distributed join or aggregation operations (e.g., corresponding to a distributed mode). In some cases, the distribute operator may specify a destination of source row(s) of a table that are, for example, subject to a distributed join or aggregation operation, such that the row(s) are sharded by hash, broadcast to all nodes, or routed to a node geographically located in the row's current database region. A latency cost of these different shardings determined by the optimizer may be adjusted to reflect differences in coordination between the nodes on which the operations execute for distributed query execution. In some cases, for a distributed mode, a latency cost of a physical operation planned to execute on respective nodes that are geographically located in multiple database regions may include the latency of initiating the operation at the gateway node and the latency of distributing rows to remote nodes located in database regions different from the database region of the gateway. Examples of physical operations that may execute on respective nodes that are geographically located in multiple database regions can include distributed group by, distinct, hash join, and merge join operations. In some cases, for a local mode, a latency cost of a physical operation planned to execute on a single node and requiring data stored in remote database regions includes latency costs in total operation costs. Examples of physical operations that can plan to execute on a single node and require data stored in remote database regions can include scan, lookup join, and index join operations. Such operations may be required to communicate with nodes storing the required data in remote database regions.

In some embodiments, the distribute operators as described herein can add both a latency cost and a network bandwidth cost to a cost of a candidate query plan determined by the optimizer. A network bandwidth cost may correspond to an estimated utilization of network bandwidth of network(s) used for communication and/or coordination between nodes impacted by a query. Communication and/or coordination between nodes as described herein may include data transfer (e.g., sending and/or receiving data) between the nodes.

Locality-Aware Cost Model

In some embodiments, as described herein, a cost model can be used by an optimizer to estimate a respective cost of each candidate query plan generated by the optimizer. A total cost of a particular candidate query plan determined by an optimizer may be based on a combination (e.g., sum) of one or more individual costs determined based on distribute operators and distribution properties included in the operation tree of the candidate query plan. From the estimated cost of each candidate query plan, the optimizer can select an optimal query plan for execution by the query execution engine. In some cases, the optimal query plan may be the candidate query plan that has the lowest cost of each of the candidate query plans. A cost model may estimate utilization of computing resources used by the query plan and/or an amount of time required to execute the query plan. In some cases, a cost model can be configured to maximize throughput of a database by causing selection of query plans having the lowest computational costs. As described herein, such a cost model can cause selection of a query plan with suboptimal (e.g., higher) latency. To account for latencies between database regions of a multi-region database, a locality-aware cost model may also estimate costs for candidate query plans based on latency costs determined for physical operations indicated by operation trees.

In some embodiments, a locality-aware cost model may be used by a locality-aware optimizer as described herein. In some cases, the locality-aware cost model may determine a latency cost for distribute operators included in an operation tree relative to one or more other physical operators that can be included in an operation tree. The cost of a distribute operator as determined by the locality-aware cost model may be correlated with (e.g., dependent on) an estimated pairwise latency for communicating (e.g., sending data) between pairs of the database regions indicated by the input distribution property and output distribution property enforced by the distribute operator. For example, the locality-aware cost model may determine higher costs for a distribute operator configured to cause communication between pairs of database regions with higher pairwise latency and may determine lower costs for a distribute operator configured to cause communication between pairs of database regions with lower pairwise latency. As described herein, a particular cost for a distribute operator may be a largest pairwise latency between database regions indicated by an input distribution property and an output distribution property enforced by the distribute operator.

In some embodiments, the locality-aware cost model may determine a network bandwidth cost for expected network bandwidth utilization for communication between database regions indicated by distribute operator(s) and distribution properties in an operation tree. In some cases, the locality-aware cost model may determine costs associated with other physical operators (e.g., such as join operators) included in an operation tree. In some cases, the locality-aware cost model may determine costs associated with a data shuffle phase for a distributed mode (e.g., distributed join and distributed aggregation operations).

In some embodiments, the locality-aware cost model may be configured with an assumption that distributed operations will execute in parallel at node(s) of the database when possible. As an example, in a distributed mode, execution requests configured to start processors on nodes located in database regions different from the database region of the gateway node may be sent to the nodes in parallel. In some cases, latencies between pairs of database regions used for determining costs by the locality-aware cost model may be pre-existing, stored latencies between pairs of database regions. The pre-existing, stored latencies may be average latencies and/or median latencies previously measured between respective nodes of pairs of database regions. In some cases, latencies between pairs of database regions used for determining costs by the locality-aware cost model may be measured latencies between pairs of database regions. As an example, a latency between a pair of database regions may be measured by a round-trip time for communicating between respective nodes located in each of the pair of database regions.

In some embodiments, latencies between pairs of database regions used for determining costs by the locality-aware cost model may be based on both pre-existing (e.g., stored) latencies between pairs of database regions and measured latencies between pairs of database regions. For example, nodes of a cluster may measure latencies between pairs of database regions of the cluster on startup of the cluster. The measured latencies may each be compared to a number of pre-existing, stored latencies. Based on each comparison, a pre-existing stored latency that was closest to the measured latency may be assigned as the assigned latency for the respective pair of database regions, where the assigned latency may be used for determining latency costs by the locality-aware cost model for the pair of database regions. Costs determined by the locality-aware cost model may be unitless, such that latency costs for distribute operators can be normalized against assigned costs of other operations such as table scan, hash join, lookup join, aggregation, etc.

In some embodiments, other operators may include respective latency and network bandwidths costs that can be used by the locality-aware cost model to determine a cost of a candidate query plan including operations requiring communication with database regions external to a database region of the gateway node. In some cases, based on lookup join and index join operations using the DistSender to fetch data from remote nodes located in database regions different from the database region of the gateway node, the locality-aware cost model may determine respective distribution costs for the lookup join and index join operations. To determine respective distribution costs for lookup join and index join operations, the locality-aware cost model may identify the database regions that will be accessed by the DistSender when fetching data for the respective operation and may determine a cost for the pairwise latencies between the database region of the gateway node and the identified database regions. In some cases, based on distributed hash and merge join operations requiring data shuffling (e.g., to redistribute data so that inputs are hashed on a join key) between nodes of different database regions for a distributed mode, the locality-aware cost model may determine respective distribution costs for the distributed hash and merge join operations. To prevent the locality-aware optimizer from always selecting a non-distributed join (e.g., a join operation executed in a local mode), the locality-aware cost model may account for the benefits of parallel computation in the cost (e.g., reduced latency cost) of distributed joins (e.g., join operations executed in a distributed mode). Similarly, the locality-aware cost model may account for latency and network bandwidth costs for distributed hash group by and distinct operators. To prevent the optimizer from always choosing a non-distributed operation, the locality-aware cost model may account for the benefits of parallel computation in the cost (e.g., reduced cost) of distributed operations.

In some embodiments, the locality-aware optimizer and the included locality-aware cost model may determine costs for candidate query plans based on a combination of latency costs, network bandwidth costs, and/or computational costs, such that optimal query plans are selected for execution based on having an optimized combination of latency, network bandwidth, and/or computational costs. In some cases, the determined costs for a candidate query plan may be based on a weighted combination (e.g., weighted sum) of a latency cost, a network bandwidth cost, and/or a computational cost for the candidate query plan, where respective weights are applied to the latency, network bandwidth, and/or computational costs. Weights for a latency cost, a network bandwidth cost, and/or a computational cost may be experimentally determined. In some cases, a cost of a candidate query plan may be a weighted sum of a latency cost, a network bandwidth cost, and/or a computational cost. A weight for a latency cost may range from 1-1000 (e.g., 10). A weight for a network bandwidth cost may be 1-100. Weights for a sequential I/O cost, processor cost, and random I/O cost that forms a computational cost may range from 0.01-10. As an example, weights for a sequential I/O cost, processor cost, and random I/O cost may be 1, 0.01, and 4, respectively. Sequential and random I/O costs may be included in an I/O bandwidth cost as described herein.

Region-Aware Query Transformations

In some embodiments, the locality-aware optimizer may perform one or more types of transformations to generate different candidate query plans, such as candidate query plans that may have a lower cost. Examples of transformations supported by optimizers can include predicate pushdown and join re-ordering transformations. The locality-aware optimizer may support and use one or more transformations configured to generate candidate plans that are optimized for execution in a multi-region database where data is deployed among different database regions.

In some embodiments, locality optimized search may be an optimization that can apply to row level regional tables when a maximum number of rows returned by an operation is known in advance. Locality optimized search may cause a query to first search for data (e.g., row(s)) matching the query stored in the local database region including the gateway node. If all data for the query is not found in the local database region, the query may execute at one or more remote database regions external to the local database region. Such an optimization may apply to scan and join operations. Locality optimized search may apply when a subtree of a query plan can be converted into a limited UNION ALL operation over two subtrees, where a first of the two subtrees can execute locally in a database region of the gateway node and a second of the two subtrees executes in remote database regions external to the local database region.

In some embodiments, the locality-aware optimizer may use one or more transformation rules configured to cause exploration of multiple partitioning schemes for distributed join operations that may be included in generated operation trees, where exploration may refer to generating a number of candidate query plans and analyzing the number of query plans to select the optimal query plan according to the locality-aware cost model. As an example, the locality-aware optimizer may include broadcast join and/or hash-partitioned join operations in operation trees generated for candidate query plans. From the generated operation trees for candidate query plans, the locality-aware optimizer may select the optimal query plan including an optimal partitioning scheme based on the locality-aware cost model described herein. In some cases, if a distributed join operation is to be distributed among multiple database regions and a partitioning column (e.g., a column indicating partitioning of a table into one or more partitions based on a respective database region for each of the partitions) is a join key for the distributed join operation, a candidate query plan generated by the locality-aware optimizer may hash-partition data within a database region and may execute the join phase of the operation before sending any data to external database regions (e.g., database regions external to the database region of the gateway node). Such operations of the locality-aware optimizer enable transformation of a single join operation across multiple database regions into a union of join operation, where each child operation of the union is a join operation that executes within a single database region.

Enforce Home Database Region

In some embodiments, schemas (e.g., regional tables and global tables) of a multi-region database may enable minimization and/or elimination network latency costs for communication between database regions. In some cases, a query received at gateway node from a client device may correspond to a particular database region (referred to as a "home region" for the query) in which the query can execute without access to data stored at node(s) in database regions external to the database region including the gateway node. To enforce execution of queries at a home region that receives the query, a locality-optimized session mode may be provided and enabled at SQL clients operating at client devices (e.g., client devices 106). A user operating a client device may provide an input to the client device configured to enable the locality-optimized session mode. When enabled, the locality-optimized session mode may cause a received query to (i) execute only in the database region of the gateway node receiving the query; or (ii) error out and not execute, such that the SQL client that initiated the query does not receive a requested response to the query. If a query can execute in only the database region of the gateway node receiving the query, the query may execute and the client device may receive a requested response for the query. If a query cannot execute in only the database region of the gateway node receiving the query, the query may not execute and the client device may not receive a requested response for the query. As an example, the gateway node may send and the client device may receive an indication of an error for the query that cannot execute in only the database region of the gateway node receiving the query.

In some embodiments, example operations of queries that cannot execute in only the database region of the gateway node receiving the query can include operations for: planning of distributed SQL processors on nodes in at least one external database region, sending data (e.g., KV data) requests to nodes in at least one external database region, and any other execution operation that is required to wait for a response from a node in at least one external database region. In some cases, example queries that cannot execute in only the database region of the gateway node receiving the query can include queries that require communication and/or coordination with node(s) geographically located in database regions external to the database region of the gateway node. A candidate query plan for a query that cannot cause execution of the query in only the database region of the gateway node receiving the query may have latency costs based on the operation tree of the candidate query plan.

In some embodiments, for a gateway node receiving queries from client devices with the locality-optimized session mode enabled, the gateway node may identify whether a received query is required to access database regions external to the database region including the gateway node. The gateway node may identify whether a query is required to access database regions external to the database region including the gateway node during generation of candidate query plans. The query may be required to access database regions external to the database region including the gateway node if all of the query plans include a distribution operator indicative of the database regions external to the database region including the gateway node. If a query is required to access database regions external to the database region including the gateway node, the query cannot execute in only the database region of the gateway node receiving the query. The query may not be required to access database regions external to the database region including the gateway node and may execute in the home region if at least one of the query plans does not include a distribution operator indicative of the database regions external to the database region including the gateway node. If a query is not required to access database regions external to the database region including the gateway node, the query can execute in only the database region of the gateway node receiving the query.

In some embodiments, for a gateway node receiving queries from client devices with the locality-optimized session mode enabled, the gateway node may dynamically identify whether data stored in database regions external to the database region of the gateway node must be accessed to execute a query. Identification of whether data stored in database regions external to the database region of the gateway node must be accessed to execute a query may be part of execution of a locality optimized search. The gateway node may dynamically identify whether data stored in database regions external to the database region of the gateway node must be accessed based on whether all data subject to the query is locally stored at node(s) geographically located in the database region of the gateway node. When the data subject to the query is locally stored at node(s) geographically located in the database region of the gateway node, the query may successfully execute. When the data subject to the query is not locally stored at node(s) geographically located in the database region of the gateway node, the query may terminate and/or otherwise fail.

For a locality-optimized session mode, if a candidate query plan includes a distribute operator indicating a database region external to the database region of the gateway node, a cost model of the locality-aware optimized may determine an infinite latency cost for the distribute operator and the corresponding candidate query plan. Such an infinite latency cost may cause candidate query plans that may execute in only the home region to be selected as an optimal query plan by the locality-aware optimizer. Based on identifying that data stored in database regions external to the database region of the gateway node must be accessed to execute a query, the gateway node may cause the query to error out, may not cause reading of the externally stored data, and may send an indication of the error for the query to the client device. In some cases, the gateway node may dynamically identify whether data stored in database regions external to the database region of the gateway node must be accessed to execute a query for locality-optimized operations such as a locality-optimized scan operation and a locality-optimized join operation.

In some cases, for the locality-optimized session mode, queries may be able to execute in a single database region when the queries require communication and/or coordination with only one respective database region and the queries are received by respective gateway nodes located in such a database region. As an example, queries may be able to execute in a single database region when the queries are directed to data and/or schemas stored in only one respective database region and the queries are received by respective gateway nodes located in such database regions. In some cases, a query may be received by a gateway node located in a database region different from a database region with which a query requires communication and/or coordination, causing the query to error out and not execute when the locality-optimized session mode is enabled for the client device initiating the query. In some cases, when a query requires communication and/or coordination with only one particular database region (e.g., based on being directed to data stored in only one database region) and the query is not received by a gateway node located in the particular database region, the gateway node that received the query may send an indication of the home region of the node with which the query requires communication and/or coordination to the SQL client operating at the client device that initiated the query. The client device may receive the indication of the home region from the gateway node. Based on receiving the indication of the home region, the SQL client may be provided an option to reinitiate (e.g., resend) the query to a node located in the database region with which the query requires communication and/or coordination. The SQL client may receive a selection (e.g., at a client device 106 via a received user input) to reinitiate the query. Based on receiving the selection to reinitiate the query and based on opening a SQL connection, the SQL client may send the query to a node (e.g., operating as a gateway node) located in the database region with which the query is required to communicate and/or coordinate. The gateway node in the database region that stores the data subject to the query may receive the query and may execute the query based on an optimal query plan as described herein.

In some embodiments, based on an optimizer selecting from a number of candidate query plans, the optimizer may not select an optimal query plan that is configured to execute within only the database region including the gateway node that received a query. For the locality-ware optimizer and when the locality-optimized session mode is enabled, the locality-aware cost model may determine a cost of a candidate query plan that does not cause query execution in only a home region to be artificially inflated with a very large (e.g., infinite) cost that is greater than any candidate query plan that does cause query execution in only the home region. The locality-optimized session mode may allow for observability into identifying queries that do not execute according to a schema design with a low-latency goal. The locality-optimized session mode may provide means to automatically correct queries that do not execute according to a schema design with a low-latency goal if a candidate query plan including a home region can be generated.

Method for Locality-Aware Query Planning

Figure 4:
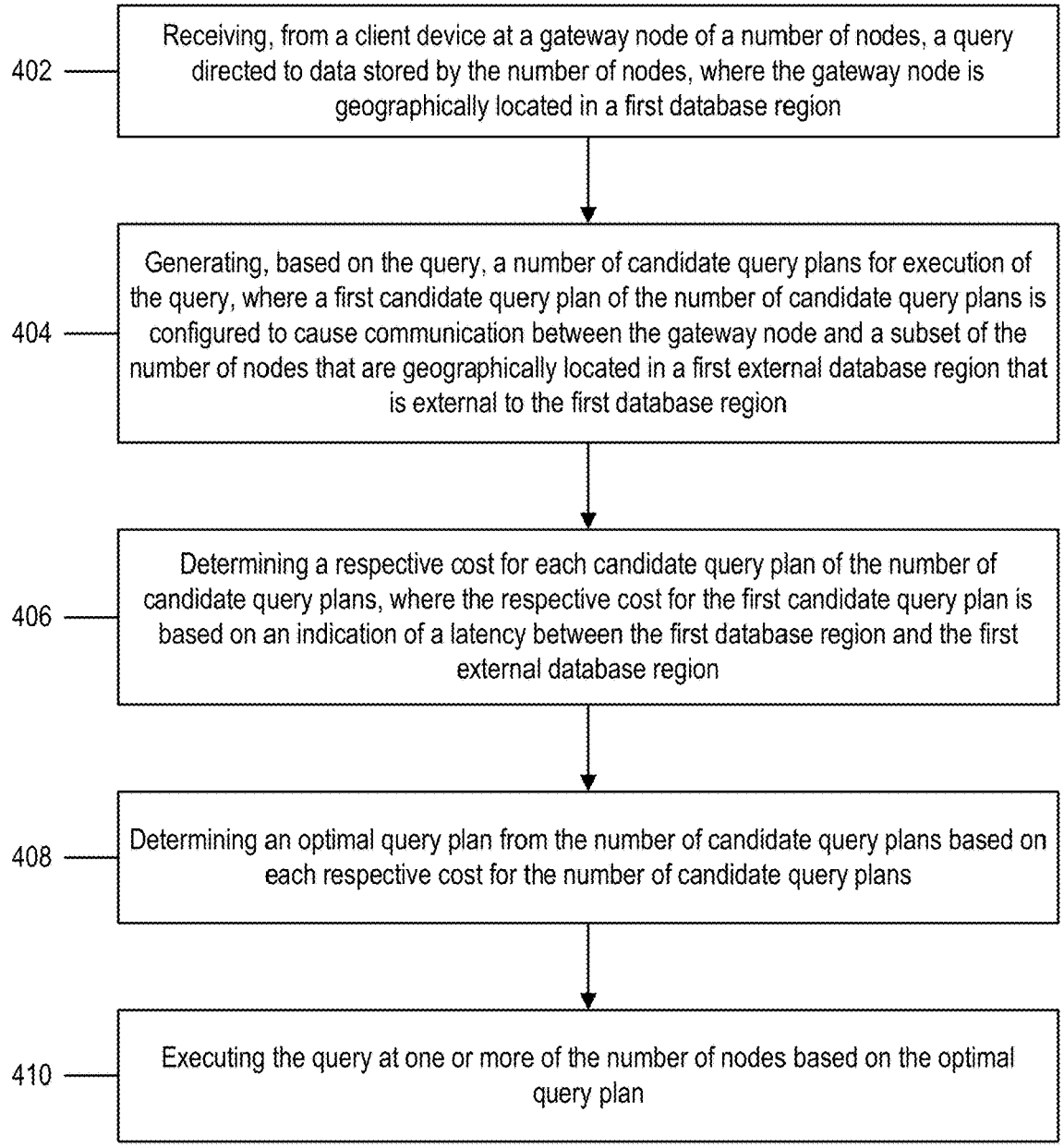
FIG. 4 shows an example flowchart for a method for locality-aware query planning and execution, according to some embodiments.

In some embodiments, nodes (e.g., nodes 120) of a cluster (e.g., cluster 102) may execute a method for locality-aware query planning and execution using the locality-aware optimizer and locality-aware cost model described herein. The nodes may execute the method for a local mode and/or a distributed mode of query execution as described herein. FIG. 4 shows an example flowchart for a method 400 for locality-aware query planning and execution. The method 400 may be performed by one or more nodes (e.g., nodes 120 based on received communications from one or more client devices (e.g., client device 106*a*, client device 106*b*, etc.). An output of the method 400 may include sending a response to a query to a client device that initiated the query, where the response is based on execution of an optimal query plan selected by the locality-aware cost optimizer described herein. For simplicity, the following paragraphs describe the method 400 with reference to query planning and execution for a single received query, where at least one candidate query plan for the query requires communication with a single external database region. However, one of ordinary skill in the art will appreciate that the steps 402-410 of the method 400 may be performed in parallel for any number of queries that may have corresponding candidate query plans that require communication with one or more external database regions. The method 400 may be performed by a gateway node and/or any other node that is required to communicate and/or coordinate with the gateway node to execute the optimal query plan for a received query. Execution of a query may occur at node(s) geographically located within a database region including a gateway node and/or at node(s) geographically located at database region(s) external to the database region including a gateway node. A result and/or response for a query may be returned to the gateway node.

At step 402, a gateway node (e.g., node 120*c*) of a cluster (e.g., cluster 102) of nodes may receive a query from a client (e.g., SQL client) operating on a client device. The gateway node may receive a query via a network connecting the client device and the gateway node. The query may be included in a read transaction and/or a write transaction as described herein. The gateway node may host a SQL connection with the client device. The query may be directed to data stored at one or more nodes that are geographically located in one or more database regions. The gateway node may be geographically located in a first database region of the one or more database regions. In some cases, the query may be directed to data that is stored in database region(s) of the one or more database regions that are external to a first database region. The query may be directed to data (e.g., KV data) included in partition(s) of table(s) stored by the one or more nodes of the cluster of nodes. In some cases, the data to which the query is directed may be included in one or more regional tables, such as row level regional tables and/or table level regional tables as described herein, where the regional table(s) may be homed in one or more database regions (e.g., database region(s) external to the database region including the gateway node).

At step 404, a locality-aware optimizer operating at the gateway node may generate a number of candidate query plans for the query. Each candidate query plan may correspond to a physical operation tree including one or more edges and one or more physical operators corresponding to physical operations executed on data stored by node(s)) of the cluster. Each operation tree may include one or more paths as described herein. Any of the operation trees may include distribute operators configured to enforce output distribution properties corresponding to sink operators included in path(s) of the respective operation trees. The distribute operators may cause communication (e.g., data transfer and/or distribution) between nodes geographically located in the same and/or different database regions. To execute the query, at least one of the candidate query plans may be configured to cause communication between the gateway node (or at least one additional node) geographically located in the first database region and external node(s) that are geographically located in one or more database regions external to the first database region. Latency costs may be associated with communications between different database regions as described herein.

At step 406, based on a locality-aware cost model, the locality-aware optimizer may determine a respective cost for each of the number of candidate query plans. The cost for each of the number of candidate query plans may be based on a latency cost, network bandwidth cost, and/or computational cost as described herein. To determine a latency cost for a first candidate query plan of the number of candidate query plans that is configured to cause inter-database region communication (e.g., between the first database region and one or more database regions external to the first database region) to execute the query, the locality-aware optimizer may determine a latency cost for each path of the operation tree corresponding to the first candidate query plan. At least one of the paths may include at least one distribute operator including an indication of an input distribution property (e.g., corresponding to a source operator of the operation tree) and an output distribution property (e.g., corresponding to a sink operator of the operation tree). The locality-aware optimizer may determine a latency cost for each distribute operator included each path, where a latency cost for a particular path is equivalent to a sum of the individual latency costs for each distribute operator included in the particular path. To determine a latency cost for each distribute operator, the locality-aware optimizer may determine indications of pairwise latencies between database regions indicated by the input distribution property and database regions indicated by the output distribution property. Pairwise latencies between a pair of database regions may be round-trip communication times between nodes located in each of the pair of database regions. The indications of the latencies may be predetermined, stored latencies and/or may be measured average latencies between pairs of database regions. Based on determined latency costs for each path included in a particular operation tree corresponding to the first candidate query plan, the locality-aware optimizer may determine a path of the operation tree that has a highest latency cost. The locality-aware optimizer may determine a latency cost of the first candidate query plan to be equivalent to the highest latency cost of a path from the paths of the operation tree of the first candidate query plan.

In some cases, the locality-aware optimizer may determine a computational utilization cost and/or a network bandwidth cost for each of the number of query plans as described herein, where a cost of a particular candidate query plan may be based on a weighted combination (e.g., weighted sum) of the latency cost, utilization cost, and/or network bandwidth cost for the candidate query plan. The computational utilization cost may be a cost based on estimated utilization of computational resources including a processor, an input/output bandwidth, and/or a memory of each of the nodes impacted by execution of the candidate query plan. The network bandwidth cost may be a cost based on an estimated utilization of network bandwidth (e.g., by an amount and/or rate of data transfer) of network(s) used by nodes impacted by execution of the candidate query plan for communication.

At step 408, based on the locality-aware cost model, the locality-aware optimizer may determine and select an optimal query plan for execution from the number of generated candidate query plans based on the respective cost of each of the generated candidate query plans. The locality-aware optimizer may select the optimal query plan by identifying the candidate query plan of the number of candidate query plans that has the lowest respective cost (e.g., as determined by the locality-aware cost model) and selecting the candidate query plan as the optimal query plan. The optimal query plan for the query may or may not be a candidate query plan having a lowest respective latency cost. For a received query including an indication of a locality-optimized session mode, the optimal query plan may only be a candidate query plan configured to execute only at node(s) geographically located in the first database region (e.g., the database region in which the gateway node is geographically located). When all candidate query plans for a received query including an indication of a locality-optimized session mode are required to execute in database regions external to the first database region, the gateway node may not select an optimal query plan, may terminate the query, and may send an indication of an error and/or the termination of the query plan to the client and client device from which the query originated.

At step 410, one or more nodes of the cluster may execute the optimal query plan. The one or more nodes of the cluster may execute the optimal query plan based on the one or more physical operators and edges indicated by the operation tree corresponding to the optimal query plan, where the physical operators and edges define an order of execution and inputs for the optimal query plan. In some cases, executing the optimal query plan may occur by a local mode or a distributed mode. Execution by the local mode may cause communication between node(s) geographically located in the database region of the gateway node and/or node(s) geographically located in one or more database regions external to the database region of the gateway node. Execution by the distributed mode may cause communication between (i) node(s) geographically located in the database region of the gateway node and node(s) geographically located in one or more database regions external to the database region of the gateway node; and optionally (ii) pair(s) of nodes geographically located in one or more database regions external to the database region of the gateway node. Execution of the query includes execution of logical and/or physical operations on data (e.g., KV data) included in partition(s) of table(s) stored by the one or more nodes. Based on execution of the query, a response to the query may be generated and/or otherwise obtained and may be provided to the gateway node. The gateway node may send the response to the client operating on the client device via a network.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Further Description of Some Embodiments

Figure 5:
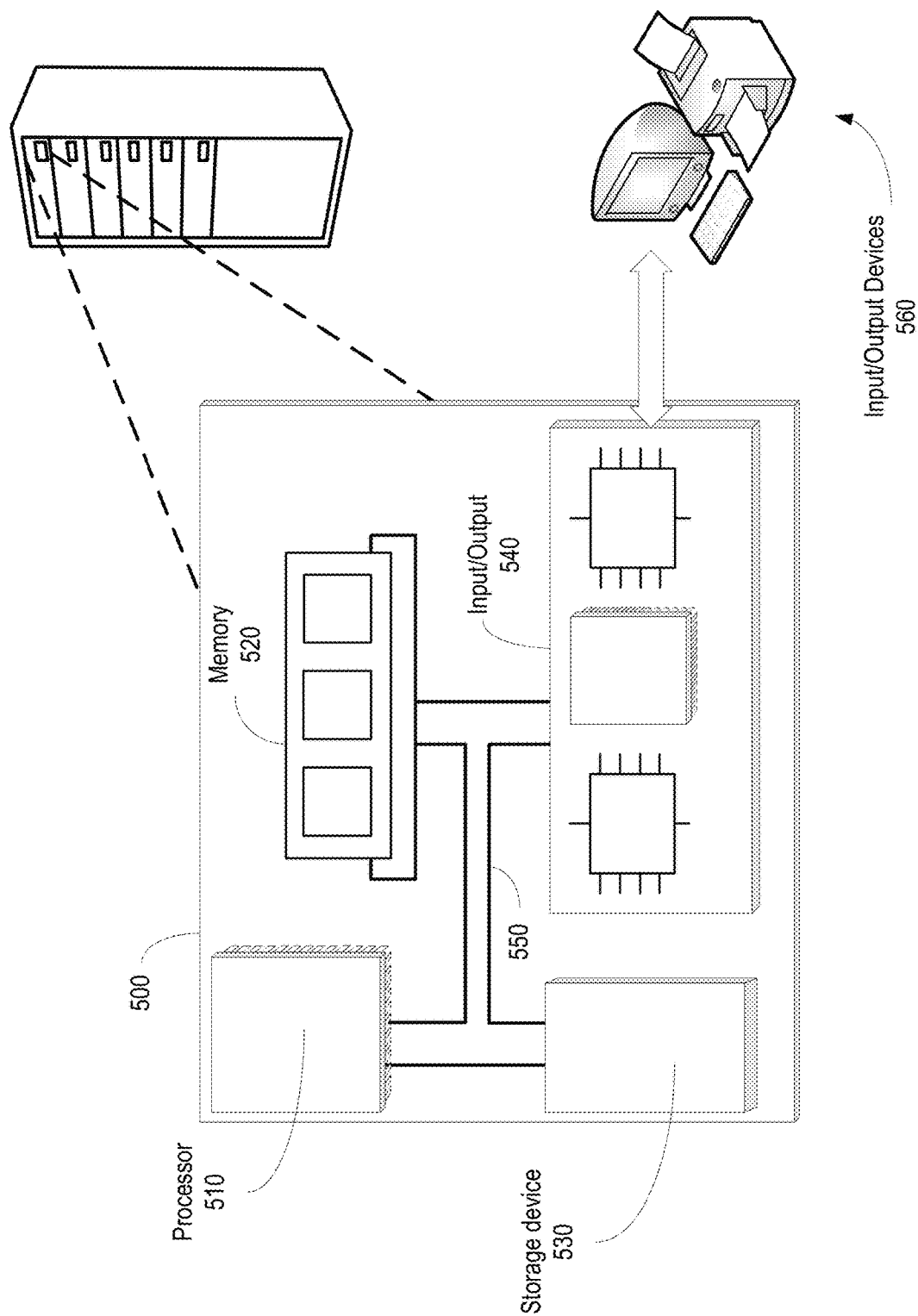
FIG. 5 is a block diagram of an example computer system, according to some embodiments.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a nonvolatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, for example as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for locality-aware query planning in a distributed computing system comprising a plurality of computing nodes, the method comprising:
   receiving, from a client device at a gateway node of the plurality of computing nodes, a query directed to data stored by the plurality of computing nodes, wherein the gateway node is geographically located in a first database region;
   generating, at the gateway node based on the query, a plurality of candidate query plans for execution of the query, wherein a first candidate query plan of the plurality of candidate query plans comprising a first physical operation tree is configured to cause communication between the gateway node and a subset of the plurality of computing nodes that are geographically located in a first external database region that is external to the first database region, wherein the first physical operation tree comprises one or more paths comprising a first path, the first path comprising indications of the first database region and the first external database region;
   determining a respective cost for each candidate query plan of the plurality of candidate query plans, the determining comprising:
      determining a latency cost for the first path of the first physical operation tree of the first candidate query plan based on an indication of a latency between the first database region and the first external database region; and
      determining the respective cost for the first candidate query plan based on at least the latency cost;
   determining an optimal query plan from the plurality of candidate query plans based on each respective cost for the plurality of candidate query plans; and
   executing the query at one or more of the plurality of computing nodes based on the optimal query plan.

2. The method of claim 1, wherein the gateway node hosts a communicative connection with the client device.

3. The method of claim 1, further comprising:
   determining the indication of the latency between the first database region and the first external database region.

4. The method of claim 1, wherein the latency between the first database region and the first external database region comprises a round-trip communication time between the first database region and the first external database region.

5. The method of claim 1, wherein the generating the plurality of candidate query plans for execution of the query further comprises:
   generating, based on one or more logically equivalent operations, a plurality of physical operation trees each comprising one or more physical operators and one or more edges indicative of an order of execution of the one or more physical operators, wherein each of the plurality of candidate query plans comprises a respective physical operation tree of the plurality of physical operation trees, wherein each of the plurality of physical operation trees comprises one or more paths each comprising a respective subset of the one or more physical operators and a respective subset of the one or more edges.

6. The method of claim 5, wherein the plurality of physical operation trees comprises the first physical operation tree, wherein the first path of the first physical operation tree comprises a first distribution physical property indicative of the first database region and a second distribution physical property indicative of the first external database region.

7. The method of claim 6, wherein the first path of the first physical operation tree comprises a first distribute physical operator comprising indications of the first distribution physical property and the second distribution physical property, wherein the first distribute physical operator is configured to enforce the second distribution physical property by causing communication between the gateway node and a first computing node of the subset of the plurality of computing nodes, wherein the first computing node is geographically located in the first external database region.

8. The method of claim 7, wherein the subset of the plurality of computing nodes are geographically located in the first external database region and a second external database region that are each external to the first database region, wherein a second computing node of the subset of the plurality of computing nodes is geographically located in the second external database region.

9. The method of claim 8, wherein the second distribution physical property is indicative of the first external database region and the second external database region, wherein the first distribute physical operator is configured to enforce the second distribution physical property by causing communication between the gateway node and the second computing node.

10. The method of claim 8, wherein the first physical operation tree comprises a third distribution physical property indicative of the second external database region, wherein the first physical operation tree comprises a second distribute physical operator comprising indications of the second distribution physical property and the third distribution physical property, wherein the second distribute physical operator is configured to enforce the third distribution physical property by causing communication between the first computing node and the second computing node.

11. The method of claim 1, wherein the determining the plurality of costs for the plurality of candidate query plans further comprises:
determining a utilization cost for an estimated utilization of computing resources for execution of the query based on the first candidate query plan; and
determining the respective cost for the first candidate query plan based on a combination of the latency cost and the utilization cost.

12. The method of claim 11, wherein the computing resources comprise a processor of the one or more computing nodes, an input/output bandwidth of the one or more computing nodes, a memory of the one or more computing nodes, and/or a network bandwidth for one or more networks communicatively connecting the one or more computing nodes.

13. The method of claim 1, wherein the determining the optimal query plan from the plurality of candidate query plans further comprises:
identifying a lowest cost of the plurality of costs, wherein the optimal query plan comprises the lowest cost; and
selecting the optimal query plan based on the optimal query plan comprising the lowest cost.

14. The method of claim 1, further comprising:
sending, by the gateway node, a result for the query to the client device based on executing the query at the one or more computing nodes.

15. The method of claim 1, wherein the query comprises an indication of an enabled session mode at the client device, and further comprising:
based on determining the query is required to execute external to the first database region, terminating the query; and
sending an indication of an error for the query to the client device.

16. The method of claim 1, wherein a plurality of database regions comprises the first database region and the first external database region, wherein each of the plurality of database regions corresponds to a respective geographic region comprising at least one computing node of the plurality of computing nodes.

17. A system for locality-aware query planning, the system comprising:
one or more computing nodes of a plurality of computing nodes, the one or more computing nodes programmed to perform operations comprising:
receiving, from a client device at a gateway node of the plurality of computing nodes, a query directed to data stored by the plurality of computing nodes, wherein the gateway node is geographically located in a first database region;
generating, at the gateway node based on the query, a plurality of candidate query plans for execution of the query, wherein a first candidate query plan of the plurality of candidate query plans comprising a first physical operation tree is configured to cause communication between the gateway node and a subset of the plurality of computing nodes that are geographically located in a first external database region that is external to the first database region, wherein the first physical operation tree comprises one or more paths comprising a first path, the first path comprising indications of the first database region and the first external database region;
determining a respective cost for each candidate query plan of the plurality of candidate query plans, the determining comprising:
determining a latency cost for the first path of the first physical operation tree of the first candidate query plan based on an indication of a latency between the first database region and the first external database region; and
determining the respective cost for the first candidate query plan based on at least the latency cost;
determining an optimal query plan from the plurality of candidate query plans based on each respective cost for the plurality of candidate query plans; and
executing the query based on the optimal query plan.

18. The system of claim 17, wherein the gateway node hosts a communicative connection with the client device.

19. The system of claim 17, wherein the operations further comprise:
   determining the indication of the latency between the first database region and the first external database region.

20. The system of claim 17, wherein the latency between the first database region and the first external database region comprises a round-trip communication time between the first database region and the first external database region.

* * * * *